United States Patent
Litt et al.

(10) Patent No.: US 7,375,176 B2
(45) Date of Patent: May 20, 2008

(54) LIQUID CRYSTAL POLY(PHENYLENE SULFONIC ACIDS)

(76) Inventors: Morton H. Litt, 52575 Charney Rd., University Heights, OH (US) 44118; Sergio Granados-Focil, 2566 Kemper Rd., Apt. 100, Shaker Heights, OH (US) 44120

( * ) Notice: Subject to any disclaimer, the term of this patent is extended or adjusted under 35 U.S.C. 154(b) by 484 days.

(21) Appl. No.: 11/094,850

(22) Filed: Mar. 31, 2005

(65) Prior Publication Data
US 2005/0239994 A1    Oct. 27, 2005

Related U.S. Application Data

(60) Provisional application No. 60/557,857, filed on Mar. 31, 2004, provisional application No. 60/615,229, filed on Oct. 1, 2004.

(51) Int. Cl.
*C08G 61/00* (2006.01)
*C08G 61/02* (2006.01)

(52) U.S. Cl. ............... 528/171; 528/373; 528/391; 528/397; 528/487

(58) Field of Classification Search ............... 528/171, 528/373, 391, 397, 487
See application file for complete search history.

(56) References Cited

U.S. PATENT DOCUMENTS

| | | | |
|---|---|---|---|
| 4,390,603 A | 6/1983 | Kawona et al. | |
| 4,849,311 A | 7/1989 | Itoh et al. | |
| 4,973,530 A | 11/1990 | Vanderborgh et al. | |
| 5,126,462 A | 6/1992 | Greber et al. | |
| 5,403,675 A | 4/1995 | Ogata et al. | |
| 5,468,574 A | 11/1995 | Ehrenberg et al. | |
| 5,525,436 A | 6/1996 | Savinell et al. | |
| 5,618,334 A | 4/1997 | Ozcayir et al. | |
| 5,679,482 A | 10/1997 | Ehrenberg et al. | |
| 5,725,633 A | 3/1998 | Ozcayir et al. | |
| 5,783,324 A | 7/1998 | Binder et al. | |
| 5,795,496 A | 8/1998 | Yen et al. | |
| 5,798,188 A | 8/1998 | Mokohyama et al. | |
| 5,964,925 A | 10/1999 | Ozcayir et al. | |
| 6,066,710 A | 5/2000 | Becker et al. | |
| 6,245,881 B1 | 6/2001 | Faure et al. | |
| 6,248,469 B1 | 6/2001 | Formato et al. | |
| 6,376,129 B2 | 4/2002 | Faure et al. | |
| 6,586,561 B1 | 7/2003 | Litt et al. | |

OTHER PUBLICATIONS

M. Baron and R.F.T.Stepto "*Definitions of Basic Terms Relating to Polymer Liquid Crystals*", Pure Appl. Chem., vol. 74, No. 3, pp. 493-509, 2002.

*Primary Examiner*—Duc Truong
(74) *Attorney, Agent, or Firm*—Tarolli, Sundheim, Covell & Tummino LLP

(57) ABSTRACT

A rigid, rod liquid crystal polymer includes a poly(phenylene sulfonic acid).

15 Claims, 13 Drawing Sheets

LIQUID CRYSTAL POLY(PHENYLENE SULFONIC ACIDS)

RELATED APPLICATIONS

The present application claims priority from U.S. Provisional Patent Application Ser. No. 60/557,857, filed Mar. 31, 2004, and U.S. Provisional Patent Application Ser. No. 60/615,229, filed Oct. 1, 2004, which are herein incorporated by reference in entirety.

TECHNICAL FIELD

The present invention relates to a polymeric material, and more particularly, to a rigid, rod liquid crystal polymer.

BACKGROUND OF THE INVENTION

A polymer electrolyte membrane (PEM) fuel cell (or proton exchange membrane fuel cell) includes a polymer electrolyte membrane that separates an anode compartment, where oxidation of a fuel occurs, and a cathode compartment, where reduction of an oxidizer occurs. The anode and cathode are essentially constituted by a porous support, such as a porous carbon support, on which particles of a noble metal (e.g., platinum) are deposited. The PEM typically provides a conduction medium for protons from the anode to the cathode as well as providing a barrier between the fuel and the oxidizer.

The polymer used to form the PEM should fulfill a number of conditions relating to mechanical, physio-chemical, and electrical properties. First, the polymer should exhibit ion exchange properties that allow sufficient conductivities to be achieved between the anode and cathode. For example, the polymer should exhibit a conductivity of at least about 0.05 mS/cm at operating conditions. In addition, the polymer should exhibit high chemical, dimensional, and mechanical stability during preparation and under extreme operating conditions, which are typically encountered in many fuel cell applications. For example, the polymer used to form the PEM should allow essentially no permeation of the fuels used in the fuel cell through the PEM. Moreover, it is desirable that the polymer used to form the PEM should be essentially water insoluble and resistant to swelling.

The polymer most widely used as a PEM for the manufacturing a fuel cell is NAFION, which is commercially available from DuPont. Polymers of NAFION are typically obtained by the co-polymerization of two fluorinated monomers, one of which carries a sulfonic acid ($SO_3H$) group after hydrolysis. NAFION is adequate for use in many current fuel cell applications, but exhibits several deficiencies. NAFION exhibits structural instability at temperatures above 100° C. Moreover, NAFION has poor conductivity at low relative humidity and can not readily be used at temperatures above 80° C. because it dries out. Furthermore, NAFION exhibits high osmotic drag, which contributes to difficulties in water management at high current densities. In addition, high methanol permeability in NAFION contributes to detrimental fuel cross over, in which fuel passes across the anode, through the NAFION membrane and to the cathode. Consequently, in instances of fuel cross over, methanol is oxidized at the cathode and fuel cell efficiency decreases.

SUMMARY OF THE INVENTION

The present invention relates to a rigid, rod liquid crystal polymer that can be used to form a polymer electrolyte membrane (PEM) or an ion exchange membrane. The liquid crystal polymer, in accordance with the present invention, can include a plurality of aromatic repeating units (e.g., phenylene groups) that are linked together to form a substantial portion of a main chain or backbone of the liquid crystal polymer. A plurality of sulfonic acid groups can be directly attached to and extend from the aromatic repeating units. The aromatic repeating units and the attached sulfonic acid groups together form calamitic mesogen units that make up a substantial portion of the liquid crystal polymer.

Rigid, rod liquid crystal polymers in accordance with the present invention can organize as nematic liquid crystals. They can also form aggregates or micelles that have a substantially planar structure with sulfonic acid groups extending from the planar structure. This provides opportunities to modify many important properties of the liquid crystal polymer, such as free volume water retention, and conductivity, by small changes in the liquid crystal polymer structure.

The liquid crystal polymers in accordance with the present invention can comprise a homopolymer or copolymer. In accordance with one aspect of the present invention, the liquid crystal polymer can comprise a homopolymer that includes a biphenylene disulfonic acid mesogen repeating unit. One example of a homopolymer comprising a biphenylene disulfonic acid repeating unit is shown below as structure I.

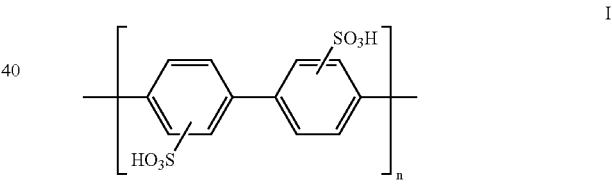

I

The sulfonic acid groups of the biphenylene disulfonic acid repeating unit can be positioned, for example, at the 2 position (i.e., meta position) and the 3 position (i.e., ortho position) of the biphenylene repeating unit as shown in structure II.

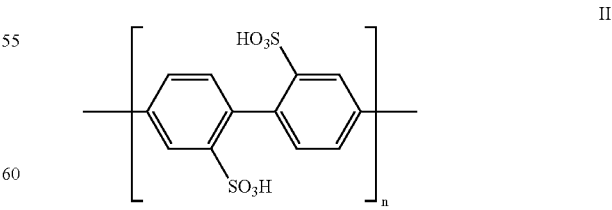

II

In accordance with another aspect of the invention, the liquid crystal polymer can comprise a phenylene sulfonic acid repeating unit in which the sulfonic acid groups are arranged randomly as shown in structure III.

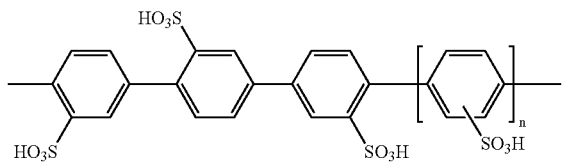

III

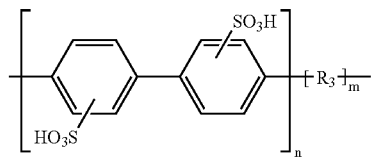

5

The poly(phenylene sulfonic acids) can be formed from any dihalo-monocylic or polycylic aryl sulfonic acid monomer that once polymerized or copolymerized comprises a substantial portion of the polymer main chain or backbone and is linear enough to form a liquid crystal. Examples of dihalo-monocylic or polycyclic aryl sulfonic acids that can be used to form the poly(phenylenesulfonic acids) include dihalo-biphenyldisulfonic acids, dihalo-phenylsulfonic acids, dihalo-phenyldisulfonic acids, and dihalo-triphenylenetrisulfonic acids, and dihalo-triphenylenedisulfonic acid. It will be appreciated that other dihalo monocyclic or polycyclic aryl hydrocarbons can also be used.

In an aspect of the invention the dihalo-monocylic or polycyclic aryl sulfonic acid monomer can be polymerized via an Ullmann coupling reaction to form the liquid crystal polymer or copolymer. The sulfonic acid groups of the dihalo-arylsulfonic acids can be protected during polymerization to optimize the polymerization reaction and mitigate the reaction of the sulfonic acid groups. The sulfonic acid groups can be protected by transforming the sulfonic acid groups into sulfonate esters in an esterifcation reaction. Alternatively, the sulfonic acid groups can be protected by forming sulfonate salts with counterions that contain bulky (i.e., enhanced spatial dimension) or long chain hydrocarbons.

In accordance with another aspect, the liquid crystal polymers of the present invention can be chemically modified to incorporate bulky side groups and/or cross-linkable groups. The bulky and/or cross-linkable groups can include at least one of tert-butylalkyl groups (e.g., neopentyl), tert-butyl phenyl groups, di(tert-butyl)phenyl groups, tert-butyl groups, tert-butyl benzyl groups, tert-butylaryl groups, tert-butylalkylaryl groups, di(tert-butylalkyl)aryl groups, tert-butyl hydroxyl alkoxy, or aryloxy phenyl groups, di(tert-butyl)hydroxyl, alkoxy, or aryloxy phenyl groups, bulky aryl groups, bulky alkyl aryl groups, tert-amyl groups, adamantyl groups, adamantylphenyl groups, substituted and unsubstituted phenols and thiophenols, 1,3,5-triphenyl benzene, trypticene, tetracylene, polycylic aromatic hydrocarbons, such as perylene, naphthalene, naphthacene, chrysene, pentacene, picene, anthracene, hexacene, rubicene, and phenanthrene, linear and branched fluoroalkyl groups, fluoroalkyl sulfones, block hydrocarbon/fluorocarbon groups, such as groups with the formula $F(CF_2)_n(CH_2)_m^-$, where m can be 0, 1, or 2, and n can be about 1 to about 10 (e.g., 6, 8, or 10), or ethers thereof as well as other molecules that contain aryl or other bulky and/or cross-linkable groups.

In accordance with yet another aspect, the liquid crystal polymers of the present invention can comprise a hydrolytically stable poly(phenylene sulfonic acid) copolymer that includes at least one of random, graded, or block repeating units of phenylene sulfonic acid and a second repeating unit that contains bulky, angled, and/or cross-linkable groups.

One example of the of a hydrolytically stable poly(phenylene sulfonic acid) copolymer comprises a biphenylene disulfonic acid repeating unit and a second repeating unit $R_3$ that contains bulky, angled, and or cross-linkable groups as depicted as follows:

The sulfonic acid groups of the biphenylene disulfonic acid repeating unit can be positioned, for example, at the 2 position (i.e., meta position) or the 3 position (i.e., ortho position) on the phenylene groups. The second repeating unit can be formed from a comonomer that includes angled groups, bulky groups, and/or cross-linkable groups.

The present invention also relates to methods and processes of forming the poly(phenylene sulfonic acid) homopolymers and copolymers as well as the comonomers used to form the poly(phenylene sulfonic acid) copolymers.

In a method in accordance with the present invention, a liquid crystal polymer can be formed by polymerizing a dihaloaryl sulfonic acid monomer via an Ullmann coupling reaction to form a poly(phenylene sulfonic acid). The dihaloaryl sulfonic acid monomer can comprise at least one of a dihalophenyl sulfonic acid monomomer, a dihalo-phenyldisulfonic acid monomer, a dihalo-biphenyldisulfonic acid monomer, a dihalo-triphenyldisulfonic acid monomer, or a dihalo-triphenyltrisulfonic acid monomer. Examples of dihaloaryl sulfonic acid monomers are 4,4'-dihalo-2,2'-biphenyldisulfonic acids, 4,4'-dihalo-3,3'biphenyldisulfonic acid, and a 1,4-dihalophenyl sulfonic acid.

The method can further comprise chemically modifying the poly(phenylene sulfonic acid) to incorporate at least one bulky group, angled group, or cross-linkable group in the polymer chain. The at least one bulky group, angled group, or cross-linkable group can render the liquid crystal polymer substantially water insoluble. The at least one of bulky groups, angled groups, or cross-linkable groups can be incorporated ionto the poly(phenylene sulfonic acid) backbone via a sulfone or sulfonate ester formation reaction.

In an aspect of the invention, the at least one bulky group or cross-linkable group can include at least one of tert-butylalkyl groups, tert-butyl phenyl groups, di(tert-butyl)phenyl groups, tert-butyl groups, tert-butyl benzyl groups, tert-butylaryl groups, tert-butylalkylaryl groups, di(tert-butylalkyl)aryl groups, tert-butyl hydroxyl, alkoxy, or aryloxy phenyl groups, di(tert-butyl)hydroxyl, alkoxy, or aryloxy phenyl groups, bulky aryl groups, bulky alkylaryl groups, tert-amyl groups, adamantyl groups, adamantylphenyl groups, substituted and unsubstituted phenols and thiophenols, 1,3,5-triphenyl benzene, trypticene, tetracylene, polycylic aromatic hydrocarbons, linear and branched fluoroalkyl groups, fluoroalkyl sulfones, block hydrocarbon/fluorocarbon groups, such as groups with the formula $F(CF_2)_n(CH_2)_m^-$, where m can be 0, 1, or 2, and n can be about 1 to about 10 (e.g., 6, 8, or 10), or ethers thereof as well as other molecules that contain aryl or other bulky and/or cross-linkable groups.

Another method of forming a liquid crystal copolymer in accordance with the present invention comprises copolymerizing a dihaloaryl sulfonic acid monomer and at least one dihalocomonomer. The dihalocomonomer can include at least one bulky and/or cross-linkable group. The dihaloaryl sulfonic acid monomer can include at least one of a dihalophenyl sulfonic acid monomomer, a dihalophenyl disulfonic acid monomer, a dihalo-biphenyldisulfonic acid monomer, a dihalo-triphenyldisulfonic acid monomer, or a dihalo-triphenyltrisulfonic acid monomer.

In an aspect of the invention, the comonomer can have the following structure:

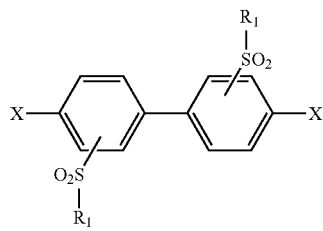

where X is Br, Cl, and/or I, where $R_1$ is an OH or comprises at least one of a bulky and/or cross-linkable group, and where at least one $R_1$ is not OH.

$R_1$ can be selected from the group consisting of hydroxyl, tert-butylalkyl groups, tert-butyl phenyl groups, di(tert-butyl)phenyl groups, tert-butyl groups, tert-butyl benzyl groups, tert-butylaryl groups, tert-butylalkylaryl groups, di(tert-butylalkyl)aryl groups, tert-butyl hydroxyl, alkoxy, or aryloxy phenyl groups, di(tert-butyl)hydroxyl, alkoxy, or aryloxy phenyl groups, bulky aryl groups, bulky alkylaryl groups, tert-amyl groups, adamantyl groups, adamantylphenyl groups, substituted and unsubstituted phenols and thiophenols, 1,3,5-triphenyl benzene, trypticene, tetracylene, polycylic aromatic hydrocarbons, linear and branched fluoroalkyl groups, fluoroalkyl sulfones, block hydrocarbon/fluorocarbon groups, such as groups with the formula $F(CF_2)_n(CH_2)_m^-$, where m can be 0, 1, or 2, and n can be about 1 to about 10 (e.g., 6, 8, or 10), or ethers thereof as well as other molecules that contain aryl or other bulky or cross-linkable groups, and where at least one $R_1$ is not OH.

BRIEF DESCRIPTION OF THE DRAWINGS

Further features of the present invention will become apparent to those skilled in the art to which the present invention relates from reading the following description of the invention with reference to the accompanying drawings.

DETAILED DESCRIPTION

Figure 1:
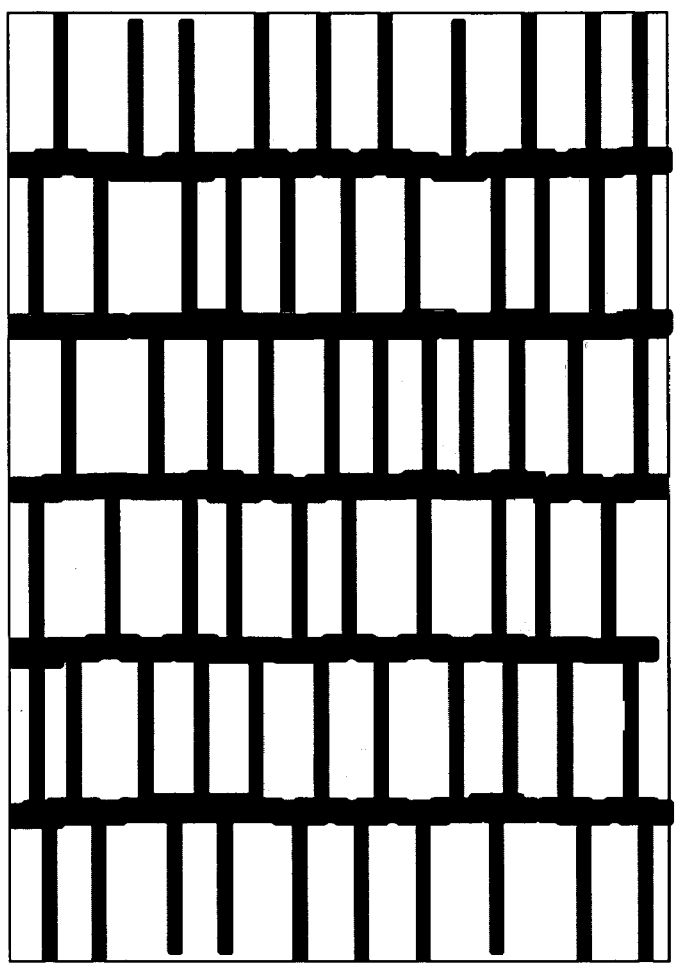
FIG. 1 illustrates a schematic view of a block copolymer in accordance with an aspect of the invention.
Figure 1:
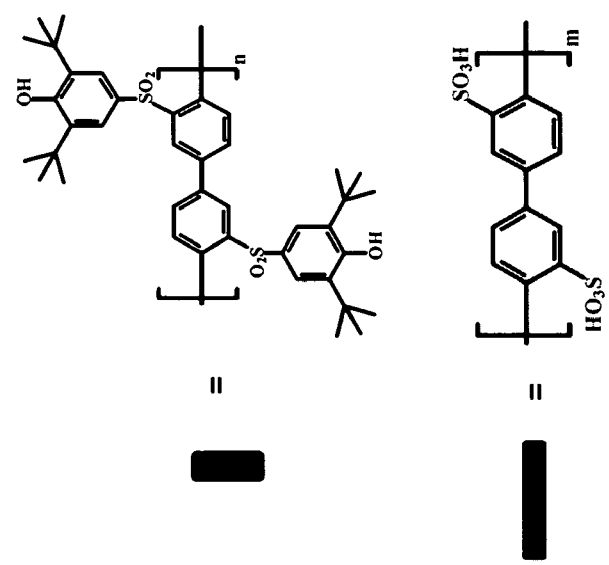

The present invention relates to polymers that can be used to form a polymer electrolyte membrane (PEM) or an ion exchange membrane. The electrolyte membrane can be particularly adapted for use in a fuel cell, liquid-ion separation, gaseous diffusion, reverse osmosis, as well as electrochemical applications, such as electroplating, electrolysis, and electrodialysis.

The polymers in accordance with the present invention are rigid, rod liquid crystal polymers. The term "liquid crystal" as used herein refers to a state in which the polymer molecules exhibit a certain degree of orientational order, between crystalline and amorphous states. In solution, molecules according to a preferred embodiment of the present invention are locally parallel above a low concentration but are still generally free to diffuse about. But, when in the form of a solid membrane, the molecules are generally fixed in place and exhibit some degree of liquid crystal order. This is particularly evident upon application of a deforming load to the membrane. During the evaporation of solvent from a solution of the polymer in accordance with the present invention, the molecules attain their orientation and are considered liquid crystalline. Molecules demonstrating such characteristics are said to be lyotropic liquid crystals.

A liquid crystal polymer in accordance with the present invention can include a plurality of aromatic repeating units (e.g., phenylene groups) that are linked together to form a substantial portion of the main chain or backbone of the liquid crystal polymer. A plurality of sulfonic acid groups can be directly attached to and extend from the aromatic repeating units. The aromatic repeating units and the attached sulfonic acid groups together form calamitic mesogen units that make up a substantial portion of the liquid crystal polymer.

The main chain or backbone of the liquid crystal polymer can be substantially free of singly bonded hetero-atoms. By substantially free of singly bonded hetero-atoms, it is meant the main chain of the liquid crystal polymer is substantially free of atoms other than carbon, such as nitrogen, oxygen, sulfur, phosphorous, or silicon, that are singly bonded and that are part of the main chain or link the aromatic repeating units. By substantially free of singly bonded hetero-atom linking groups, it, however, is not meant to exclude aromatic repeating units that have substituents or groups that include singly bonded hetero-atoms. A liquid crystal polymer that comprises a main chain or backbone of aromatic repeating units and that is substantially free of singly bonded hetero-atoms is resistant to hydrolytic degradation. Resistance to hydrolytic degradation is advantageous as polymer electrolyte membranes are typically operated in the presence of water or an aqueous solution.

The liquid crystal polymer in accordance with the present invention can comprise a homopolymer or copolymer. The copolymer can have a backbone (or chain) that comprises blocks or sequences of aromatic ring repeating units substantially free of singly bonded hetero-atoms. The blocks or sequences of aromatic repeating units can be linked together with other blocks or sequences of aromatic repeating units to form random, graded, or block copolymers. These other blocks or sequences of aromatic repeating units, which link the blocks or sequences of aromatic repeating units, can include singly bonded hetero-atoms as long as the liquid crystal polymer's resistance to hydrolytic degradation is not substantially affected.

In accordance with one aspect of the present invention, the liquid crystal polymer can comprise a homopolymer that includes a phenylene mesogen repeating unit with at least one sulfonic acid group that is attached to and extends from the phenylene repeating unit. An exemplary liquid crystal polymer in accordance with this aspect of the invention comprises a biphenylene disulfonic acid repeating unit, as shown in structure I.

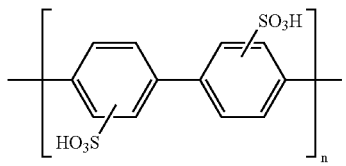

I

The sulfonic acid groups of the biphenylene sulfonic acid repeating unit can be attached to and extend away from the phenylene ubstituents. The sulfonic acid groups can be positioned at the 2 position (i.e., meta position) or the 4 position (i.e., ortho position) on the phenylene groups as shown in structure II.

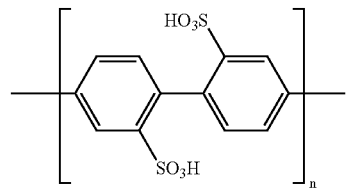

II

The poly(phenylene sulfonic acids) depicted by structure II can be formed from 4,4'-dihalo-biphenyldisulfonic acids. Examples of 4,4'-dihalo-biphenyldisuflonic acids that can be used to form the poly(phenylene sulfonic acid) depicted by structure II can include 4,4'-dihalo-2,2'-biphenyldisulfonic acids, such as 4,4'-diiodo-2,2'-biphenyldisulfonic acid, 4,4'-dibromo-2,2'biphenyldisulfonic acid, and 4,4'-dichloro-2,2'-biphenyldisulfonic acid, and 4,4'-dihalo-3,3'-biphenyldisulfonic acids, such as 4,4'-diiodo-3,3'-biphenyldisulfonic acid, 4,4'-dibromo-3,3'-biphenyldisulfonic acid, and 4,4'-dichloro-3,3'-biphenyldisulfonic acid.

In one method, the 4,4'-dihalo-biphenyldisulfonic acids can be synthesized from 4,4'-diamino-2,2'-biphenyldisulfonic acid by a diazotization reaction (Courtot Ch., Lin C. C. Bull. Soc. Chem. Fr. 1931, [4] 49, 1047). For instance, 4,4'-diamino-2,2'-biphenyldisulfonic acid was reacted in the presence of sodium nitrite (NaNO$_2$), hydrochloric acid (HCl), and potassium iodide (KI) to form 4,4'-diiodo-2,2'-biphenyldisulfonic acid. It will be appreciated by one skilled in art that other 4,4'-dihalo-2,2'-biphenylsulfonic acids can be synthesized by diazotization of 4,4'-diamino-2,2'-biphenyldisulfonic acid as well as by other synthetic methods, such as by sulfonating 1,4-dibromobenzene and coupling two molecules using copper metal.

The 4,4'-dihalo-biphenyldisulfonic acids can be polymerized using, for example, an Ullmann coupling reaction. In an Ullmann coupling reaction, 4,4'-dihalo-biphenyldisulfonates formed from the 4,4'-dihalo-biphenylsulfonic acids are coupled in the presence of a copper catalyst. The following reaction scheme illustrates an example of an Ullmann type coupling reaction of 4,4'-dihalo-biphenyldisulfonate to form poly(phenylene sulfonic acid).

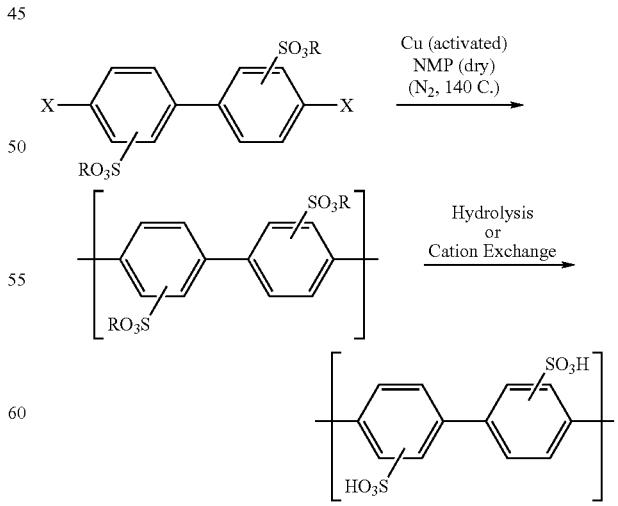

X in the preceding reaction scheme can be a halogen, such as bromine (Br), chlorine (Cl), or iodine (I) or a combination thereof and R is an organic group of an organic salt. The sulfonate groups can be, for example, ortho (i.e., at 3,3' position) relative to the halogens. One example of a 4,4'-dihalo-biphenyldisulfonate monomer that can be polymerized using the Ullmann reaction scheme was found to be the 4,4'-dibromo-3,3'-biphenyldisulfonate ammonium salt. 4,4'-dibromo-3,3'-biphenyldisulfonate was found to couple more efficiently and to yield a higher molecular weight polymer compared to other 4,4'-dihalo-biphenyldisulfonate monomers. This monomer can be formed, for example, from 4,4'-bromo-3,3'-biphenyldisulfonic acid, which in turn can be formed by heating 4,4'-dibromobiphenyl in the presence of concentrated sulfuric ($H_2SO_4$) at a temperature of about 180° C. for about 45 minutes.

It will be appreciated that other 4,4'-dihalo-biphenyldisulfonic acids can be polymerized using the Ullmann coupling reaction. Other approaches can also be used to polymerize the 4,4'-dihalo-biphenylsulfonic acids as long as these other approaches avoid adversely affecting the sulfonic groups. Examples of these other approaches can include using different coupling reagents or catalysts, such as palladium (Pd), nickel (Ni), or nickel/zinc (Ni(0)/Zn), which are disclosed in Lemaire et al., Aryl-Aryl Bond Formation One Century After the Discovery of the Ullmann Reaction, *Chem. Rev.* 2002, 102, 1359-1469, herein incorporated by reference. It will also be appreciated that yet other approaches can be used to polymerize the dihalo-biphenyldisulfonic acids.

In accordance with another aspect of the invention, the liquid crystal polymer can comprise a phenylene sulfonic acid repeating unit in which the sulfonic acid groups are arranged randomly as shown in structure III.

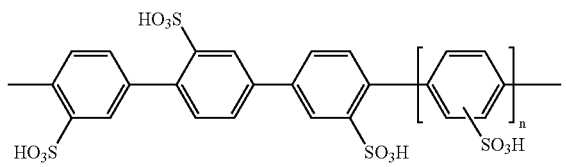

III

The poly(phenylene sulfonic acid) depicted by structure III can be formed from 1,4-dihalo-phenyl sulfonic acid. An example of a 1,4-dihalo-phenyl sulfonic acid that can be used to form the poly(phenylene sulfonic acid) depicted by structure III is 1,4-di-iodo phenyl sulfonic acid. The 1,4-diiodo phenyl sulfonic acid can be polymerized using an Ullmann coupling reaction or other aryl-aryl coupling reactions, which avoid adversely affecting the sulfonic acid groups.

It will be appreciated that the poly(phenylene sulfonic acids) in accordance with the present invention can be formed from any dihalo-monocylic or polycylic aryl sulfonic acid monomer that once polymerized or copolymerized comprises a substantial portion of the polymer main chain or backbone and is linear enough to form a liquid crystal. Examples of other dihalo-monocyclic or polycyclic aryl sulfonic acid monomoers, besides 4,4'-dihalo-biphenyldisulfonic acids and 1,4-dihalo-phenylsulfonic acids, that can be used to form the poly(phenylenesulfonic acids) include dihalo-phenyldisulfonic acids, dihalo-triphenyltrisulfonic acids, and dihalo-triphenyldisulfonic acids. It will be appreciated that other dihalo monocyclic or polycyclic aryl hydrocarbons can also be used.

In accordance with another aspect of the invention, the sulfonic acid groups of the dihalo-arylsulfonic acids can be protected during polymerization to optimize the polymerization reaction and mitigate the reaction of the sulfonic acid groups. For example, the sulfonic acid groups can be protected by transforming the sulfonic acid groups into sulfonate esters in an esterifcation reaction. The protecting groups that can be used to form the sulfonate esters include bulky or long chain hydrocarbons, such as aryl groups (e.g., phenyl groups), alkyl aryl groups (e.g., tert-butyl phenyl and nonyl-phenyl), as well as any other groups the can form an ester protecting group.

Alternatively, the sulfonic acid groups can be protected by forming sulfonate salts with counterions that contain bulky (i.e., enhanced spatial dimension) or long chain hydrocarbons. Bulky or long chain hydrocarbon counterions can potentially improve the solubility of the dihalo-biphenyldisulfonic acids during polymerization, which can further optimize the polymerization reaction. Examples of bulky counter ions that can be used include quaternary ammonium counterions, such as pyridinium, 4-methyl pyridinium, and 4-(dimethylamino)-pyridinium, and benzyltrimethyl ammonium (BTMA). Other bulky counterions that can be used include tribenzylmethyl ammonium and di(tert-butyl)dimethyl ammonium. Tribenzylmethyl ammonium was recently synthesized by the reaction of triphenylamine with $CH_3I$ or $(CH_3)_2SO_4$. Di(tert-butyl)dimethyl ammonium was recently synthesized by reacting 2,2'-dimethylpropanenitrile in the presence of rhodium/aluminum oxide ($Rh/Al_2O_3$) and hydrogen gas at one atmosphere to form di(tert-butyl)amine. The di(tert-butyl) amine was reacted with a formic acid/formaldehyde mixture to form di(tert-butyl)methylamine, which was, in turn, reacted with methyl iodide to form di(tert-butyl)dimethyl ammonium. It will be appreciated that, phosphorous containing counterions, such as tetrabutyl phosphonium, can also be used instead of quaternary ammonium counterions.

Protecting the sulfonic groups of the dihalo-biphenyldisulfonic acids during polymerization can also increase the molecular weight of the resulting poly(phenylene sulfonic acid) polymers so that free standing films of the poly(phenylene sulfonic acid) polymers can be readily cast. This increase in molecular weight can be shown by measuring the intrinsic viscosity (dl/g) of the polymers formed using different protective groups. The higher the measured intrinsic viscosity the greater the degree of polymerization. For example, it was found that a poly(phenylene sulfonic acid) polymer formed from 4,4'-dibromo-3,3'-biphenyldisulfonate protected with a trimethylbenzyl ammonium counterion, had an intrinsic viscosity of 0.61 dl/g, compared to an intrinsic viscosity of 0.16 dl/g for a poly(phenylene sulfonic acid) formed from 4,4'-diiodo-2,2'-biphenyldisulfonic acid protected with trimethylphenyl ammonium counterion.

Homopolymers and copolymers of the poly(phenylene sulfonic acids) so formed can be cast from water and/or a variety of polar organic solvents in the form of films. This allows the homopolymers or copolymers to be directly cast on electrodes as PEMs in membrane electrode assembly (MEA) processing for lower power micro-fuel cells. These polyelectrolyte membranes can have proton conductivities, for example, of about 0.27 mS/cm at about 75% relative humidity and about 75° C., which is about 10 times higher than that of NAFION under those conditions. Moreover, preliminary measurements show that poly(phenylene sulfonic acid) homopolymers and copolymers in accordance with the present invention exhibit substantially no permeation of methanol. Methanol is one potential fuel that can be used in MEA applications. Further, although the poly(phenylene sulfonic acid) homopolymers are soluble in water, they are chemically stable up to about 250° C.

The liquid crystal polymers in accordance with the present invention can also comprise poly(phenylene sulfonic acids) that are chemically modified to incorporate bulky side groups and/or cross-linkable groups. The bulky side groups and/or cross-linkable groups can improve the dimensional stability of the poly(phenylene sulfonic acids) and render the poly(phenylene sulfonic acids) substantially water insoluble. The bulky side groups and/or cross-linkable groups can also have a geometry that separates adjacent polymer molecules. Such separation creates regions of access, nanopores, or channels along the respective polymer chains. These regions of access, nanopores, or channels along the polymer chains exposes sulfonic acid groups along the backbone.

The bulky and/or cross-linkable side groups can be incorporated into the poly(phenylene sulfonic acid) backbone via a sulfone or sulfonate ester formation reaction to form a poly(phenylene sulfonic acid) copolymer, as shown below.

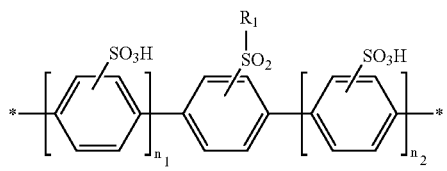

where $R_1$ comprises a bulky group (e.g., di-(tert-butyl) hydroxyphenyl) and/or a cross-linkable group (e.g., biphenyl) and where at least one of $n_1$ and $n_2$ is not 0.

The mole fraction of $R_1$ groups incorporated into the backbone of the polymer chain can range, for example, for about less than 1% to about 50%. Mole fraction refers to that fraction of sulfonic acid groups that may be transformed to sulfone or sulfonate esters by the grafting reaction. By way of example, the mole fraction of $R_1$ groups incorporated into the backbone of the polymer chain can be from about 5% to about 25% (e.g., about 5%).

It will be appreciated that other bulky groups and/or cross-linkable groups can also improve the dimensional stability of the poly(phenylene sulfonic acids). Such other bulky groups can include tert-butylalkyl groups, tert-butyl phenyl groups, di(tert-butyl)phenyl groups, tert-butyl groups, tert-butyl benzyl groups, tert-butylaryl groups, tert-butylalkylaryl groups, di(tert-butylalkyl)aryl groups, tert-butyl hydroxyl, alkoxy, or aryloxy phenyl groups, di(tert-butyl)hydroxyl, alkoxy, or aryloxy phenyl groups, bulky aryl groups, bulky alkylaryl groups, tert-amyl groups, adamantyl groups, adamantylphenyl groups, substituted and unsubstituted phenols, thiophenols, and their ethers as well as linear and branched fluoroalkyl groups, fluoroalkyl sulfones, and block hydrocarbon/fluorocarbon groups, such as groups with the formula $F(CF_2)_n(CH_2)_m^-$, where m can be 0, 1, or 2, and n can be about 1 to about 10 (e.g., 6, 8, or 10). It will also be appreciated that other cross-linkable groups can improve the dimensional stability of the poly(phenylene sulfonic acids), such as 1,3,5-triphenyl benzene, trypticene, and tetracylene, as well as other molecules that contain aryl or other cross-linkable groups. Example of other cross-linkable groups can include 1,3,5-triphenyl benzene, trypticene, and tetracylene, other polycylic aromatic hydrocarbons, such as perylene, naphthalene, naphthacene, chrysene, pentacene, picene, anthracene, hexacene, rubicene, and phenanthrene, and ethers thereof.

One example of a sulfone formation reaction is shown below. In this reaction, the poly(phenylene sulfonic acid) homopolymer is combined with a substituted phenyl group in the presence of polyphosphoric acid (PPA) at about 140° C.

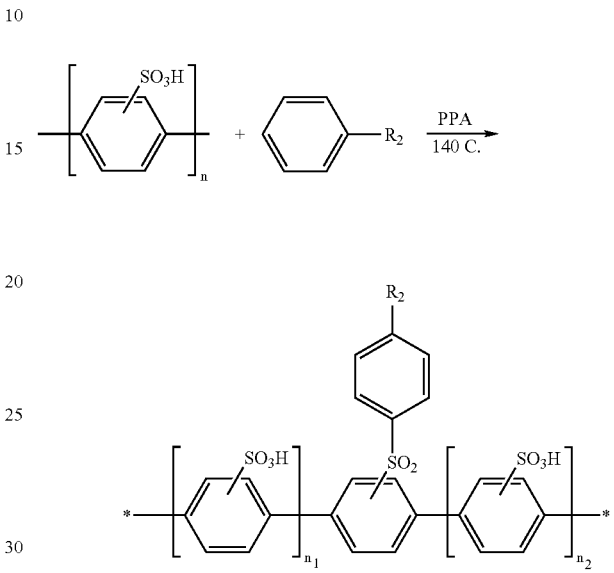

wherein $R_2$ is a bulky group, such as tert-butyl, and/or a cross-linkable group, such as phenyl. Poly(phenylene sulfonic acid) copolymers containing about 5% of tert-butyl benzene sulfone are substantially water insoluble. Polymers containing a mole fraction of about 5% to about 20% of biphenyl sulfone groups crosslink after about 20 minutes at about 200° C. and become substantially insoluble.

Another example of a sulfone formation reaction is shown below. In this example the poly(phenylene sulfonic acid) homopolymer is reacted with trypticene in the presence of polyphosphoric acid (PPA) at about 140° C. to form the poly(phenylene sulfonic acid) copolymer.

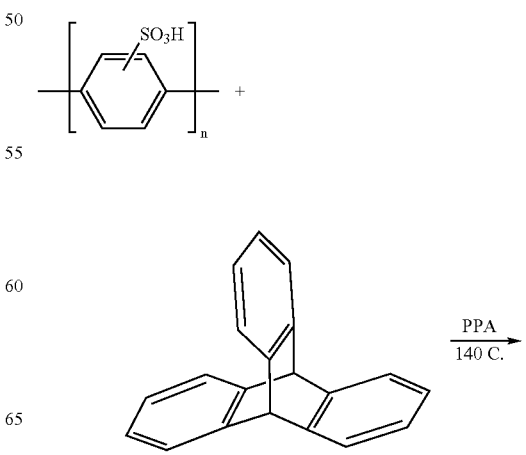

-continued

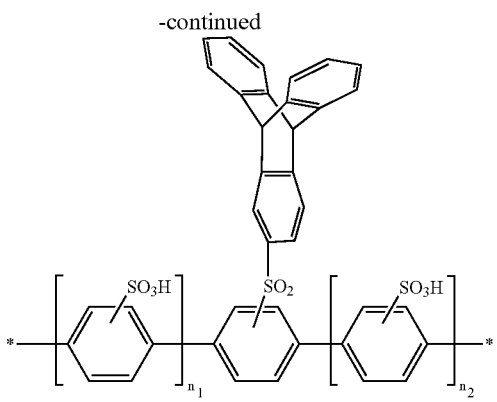

The trypticene incorporated in the backbone of the liquid crystal polymer chain can potentially create large gaps between adjacent polymer chains. These large gaps could potentially allow more water molecules to be associated with each sulfonic groups, which permits higher conductivity when the copolymer is used as a PEM in an MEA.

It will be appreciated that the foregoing grafted polymers can also be formed via a sulfonate ester formation reaction instead of a sulfone formation reaction.

In accordance with yet another aspect of the present invention, the liquid crystal polymers can comprise a hydrolytically stable poly(phenylene sulfonic acid) copolymer. As shown below, the poly(phenylene sulfonic acid) copolymer can include random, graded, or block repeating units of phenylene sulfonic acid and a second repeating unit, $R_3$, that includes a bulky, angled, and/or cross-linkable groups.

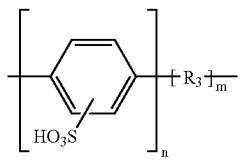

where n can be an integer greater than or equal to 1 for a random, graded and/or block copolymer, and m is 1 for a random compolymer and an integer greater than 1 for a block copolymer.

The sulfonic groups in the phenylene sulfonic acid repeating unit provide for proton conductivity and, when the polymer is formed into a membrane, promote the passage of hydronium ions across the membrane. The bulky, angled, and/or cross-linkable groups of the second unit can have a geometry that results in the separation of adjacent copolymer molecules from one another. Such displacement creates regions of access, nanopores, or channels along respective polymer chains. The regions of access along the polymer chains expose sulfonic groups along the backbone of the respective polymers.

The mole fraction of comonomers, i.e., $R_3$ groups, incorporated into the copolymer chain, can be that percentage, which does not adversely affect the mechanical properties, hydrolytic stability, thermal stability, etc. or electrical properties (e.g., ion mobility) of the resulting copolymer. In one example, the mole fraction of comonomer in the copolymer can be in the range of about less than 1% to about 30%. Another example of the mole fraction of $R_3$ groups incorporated into the backbone of the polymer chain can be from about 5% to about 25%. Typically, the mole fraction of comonomer repeating units incorporated into the copolymer chain is such that the fraction of phenylene sulfonic acid repeating units (n) is substantially greater than the fraction of comonomer units (m). For example, the n:m ratio can be least about 2:1, and more particularly at least about 4:1.

One example of a hydrolytically stable poly(phenylene sulfonic acid) copolymer includes a biphenylene-disulfonic acid repeating and a second repeating unit, $R_3$, that contains bulky, angled, and or cross-linkable groups is depicted as follows:

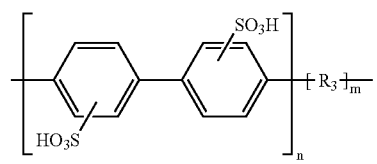

where n is an integer greater than or equal to 1 for a random or block copolymer, and m is 1 for a random compolymer and an integer greater than 1 for a block copolymer.

The sulfonic acid groups of the biphenylene disulfonic acid repeating unit can be positioned, for example, at the 2 position (i.e., meta position) or the 3 position (i.e., ortho position) on the phenylene groups.

The biphenylene sulfonic acid repeating unit can be formed from dihalo-biphenyldisulfonic acids. Examples of dihalo-biphenyldisulfonic acids that can be used to form the poly(phenylene sulfonic acid) depicted by the foregoing structure can include 4,4'-dihalo-2,2'-biphenyldisulfonic acids, such as 4,4'-diiodo-2,2'-biphenyldisulfonic acid, 4,4'-dibromo-2,2'biphenyldisulfonic acid, 4,4'-dichloro-2,2'-biphenyldisulfonic acid, and 4,4'-dihalo-3,3'-biphenyldisulfonic acid, such as 4,4'-diiodo-3,3'-biphenyldisulfonic acid, 4,4'-dibromo-3,3'-biphenyldisulfonic acid, 4,4'-dichloro-3, 3'-biphenyldisulfonic acid.

The comonomer that is used to form the second repeating unit may be synthesized from a diamine. Diamines can be readily transformed into dihalides by a diazotization reaction (Courtot Ch., Lin C. C. *Bull. Soc. Chem. Fr.* 1931, [4] 49, 1047). A dihalide comonomer can be readily polymerized with the dihalo-biphenyl sulfonic acid via an Ullmann coupling reaction or another coupling reaction.

In one aspect of the invention the comonomer can comprise a 4,4'-dihalo-sulfonyl-biphenyl that has the following structure:

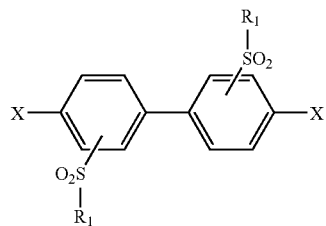

wherein X is a halogen, such as Br, Cl, and/or I, and where at least one $R_1$ that is attached to a sulfonyl group comprises a bulky group (e.g., di-(tert-butyl) hydroxyphenyl) and/or a cross-linkable group (e.g., biphenyl), the other R$_1$ being a hydroxyl group or a bulky group (e.g., di-(tert-butyl) hydroxyphenyl) and/or a cross-linkable group (e.g., biphenyl); and where sulfonyl groups are attached, at the 2 position (i.e., meta position) on the phenylene groups, or the 3 position (i.e., ortho position) on the phenylene groups.

One example of a 4,4'-dihalo-disulfonyl-biphenyl that includes a bulky group is 4,4'-dibromo-3,3'-di(tert-butyl) hydroxyphenylsulfonyl-biphenyl, which has the following structure.

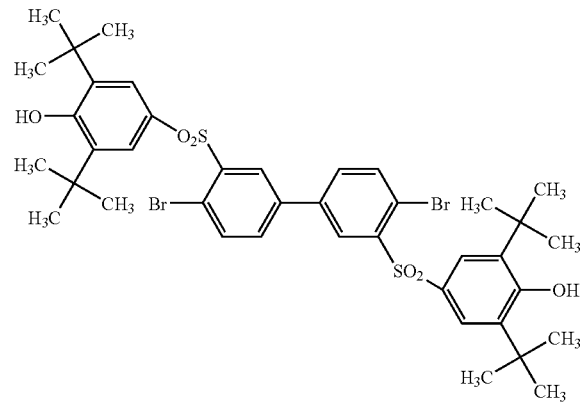

4,4'-dibromo-3,3'-di(tert-butyl)hydroxyphenylsulfonyl-biphenyl can potentially be formed by reacting 4,4'-dibromo-3,3'-biphenyldisulfonic acid with excess 2,5-di-(tert-butyl)phenol in the presence of methyl sulfonic acid and phosphoric anhydride (P$_2$O$_5$). Alternatively, 4,4'-dibromo-3,3'-di(tert-butyl)hydroxyphenylsulfonyl-biphenyl can potentially be made by initially forming 4-bromo-di-(tert-butyl)anisole, lithiating it, and reacting the lithiated product with the monomer-sulfonyl chloride. 4,4'-Dihalo-3,3'-di(tert-butyl)hydroxyphenylsulfonyl-biphenyl can then be readily copolymerized with 4,4'-dibromo-3,3'-biphenyldisulfonate to form the copolymer that includes the structure shown below.

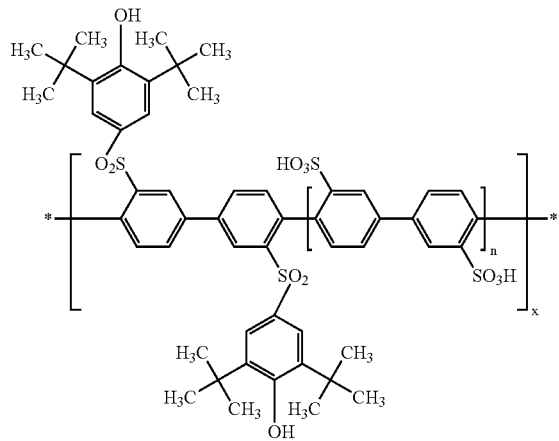

The copolymer shown above can be copolymerized randomly or in blocks to give tri-or multiblock polymers with relatively long hydrophobic sequences (e.g., 5-100-5). The large cross-sectional area of the 4,4'-dibromo-3,3'-di(tert-butyl)hydroxyphenylsulfonyl-biphenyl comonomer combined with the rigid rod structure means that molecules in the ionic part of the chain must remain separated even if the polymer is at a low humidity.

It will be appreciated that the halogens (i.e., Br) in the above monomers can be substituted with other halogens, such as chlorine and iodine. Moreover, it will be appreciated that the sulfonic acid groups of the 4,4'-dibromo-3,3'-biphenyldisulfonic acid can be positioned meta to the halogen (i.e., Br) instead of ortho.

One example of a 4,4'-dihalo-sulfonyl-biphenyl that includes a bulky, cross-linkable comonomer is 4,4'-dibromobiphenyl-3,3'-di-biphenylsulfone, which has the structure shown below.

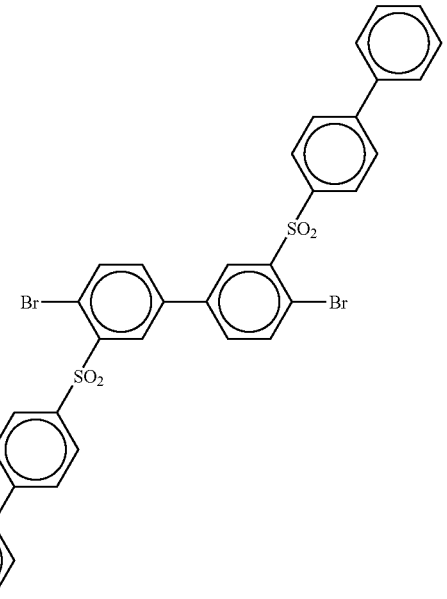

4,4'-dihalobiphenyl-3,3'-di-biphenylsulfone can be readily formed by reacting 4,4'-dihalo-3,3'-biphenyldisulfonic acid with excess biphenyl in the presence of methyl sulfonic acid and phosphoric anhydride (P$_2$O$_5$) at 80° C. 4,4'-Dihalo-3,3'-biphenylsulfonyl-biphenyl can then be readily copolymerized with 4,4'-dihalobiphenyl-3,3'-di-biphenylsulfone to form the copolymer that includes the structure shown below.

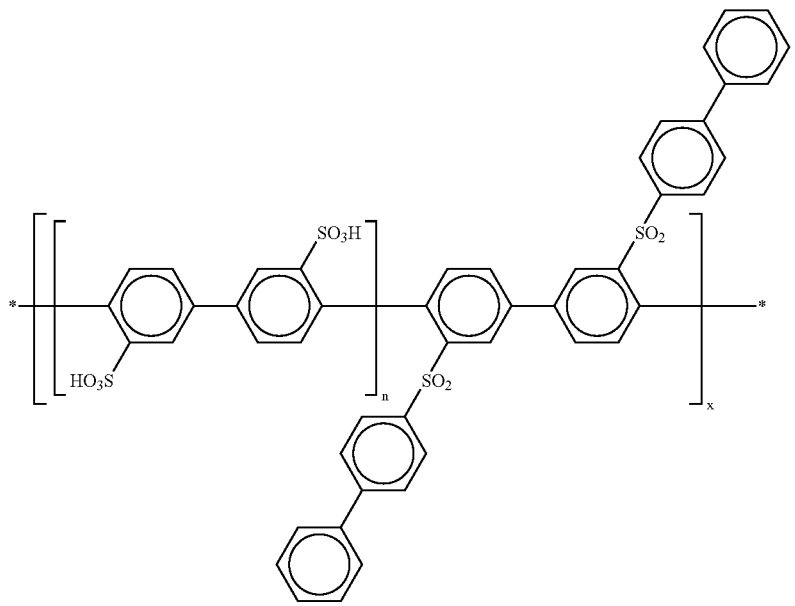

If a random copolymer is formed, the random copolymer can then be cross-linked by heating the copolymer to a temperature of about 200° C. The cross-linked copolymer was found to be substantially insoluble in water. Cross-linking the biphenyl grafted polymer forms biphenyl disulfones. The final sulfone mole fraction can be double the added biphenyl fraction. This can lower the ratio of unreacted to reacted acid groups from, for example, 2:1 to 1:1. Even at a 1:1 ration, the acid equivalent weight with only be about 350, which is much smaller most reported aromatic sulfonic acid polymers.

If a block copolymer is formed, the block copolymer may not crosslink, but still will be very water insoluble because the blocks containing the biphenyl units are hydrophobic. They can associate with each other in a separate domain and prevent the material from dissolving, or even swelling very much when in contact with water.

It will also be appreciated that the halogens (i.e., Br) in the above monomers can be replaced with other halogens, such as chlorine and iodine. Moreover, it will be appreciated that the sulfonic acid groups of the 4,4'-dibromo-3,3'-biphenyldisulfonic acid can be positioned meta to the halogen (i.e., Br) instead of ortho.

It will be appreciated that $R_1$ in the foregoing comonomer can include other bulky groups and/or cross-linkable groups. Such other bulky groups can include tert-butylalkyl groups, tert-butyl phenyl groups, di(tert-butyl)phenyl groups, tert-butyl groups, tert-butyl benzyl groups, tert-butylaryl groups, tert-butylalkylaryl groups, di(tert-butylalkyl)aryl groups, tert-butyl hydroxyl, alkoxy, or aryloxy phenyl groups, di(tert-butyl)hydroxyl, alkoxy, or aryloxy phenyl groups, bulky aryl groups, bulky alkylaryl groups, tert-amyl groups, adamantyl groups, adamantylphenyl groups, substituted and unsubstituted phenols and thiophenols (e.g., phenol, naphthol, and anthracenol), as well as linear and branched fluoroalkyl groups, fluoroalkyl sulfones, and block hydrocarbon/fluorocarbon groups, such as groups with the formula $F(CF_2)_n(CH_2)_{m-}$, where m can be 0, 1, or 2, and n can be about 1 to about 10 (e.g., 6, 8, or 10). It will also be appreciated that other cross-linkable groups can improve the dimensional stability of the poly(phenylene sulfonic acids), such as 1,3,5-triphenyl benzene, trypticene, and tetracylene, as well as other molecules that contain aryl or other cross-linkable groups. Example of other cross-linkable groups can include 1,3,5-triphenyl benzene, trypticene, and tetracylene, other polycylic aromatic hydrocarbons, such as perylene, naphthalene, naphthacene, chrysene, pentacene, picene, anthracene, hexacene, rubicene, and phenanthrene.

It will also be appreciated that $R_1$ can comprise ethers of the foregoing bulky and/or cross-linkable groups so that the bulky and/or cross-linkable groups forms an sulfonate ester instead of a sulfone, such as shown below.

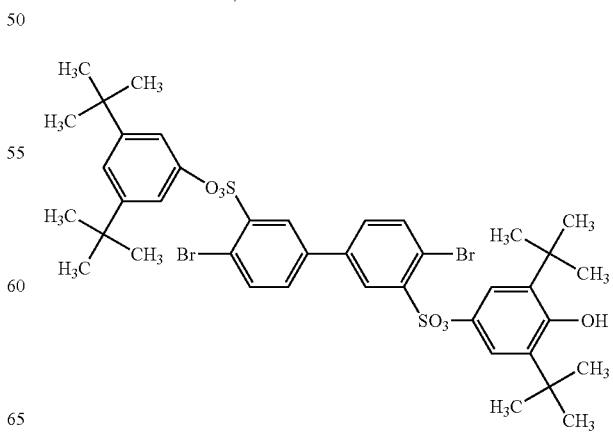

In accordance with another aspect of the invention, the bulky and/or cross-linkable comonomer that can be used to form the copolymer is 2,7-dihalo-9,9'-spirobifluorene (DHSF). The synthesis of this monomer is depicted below:

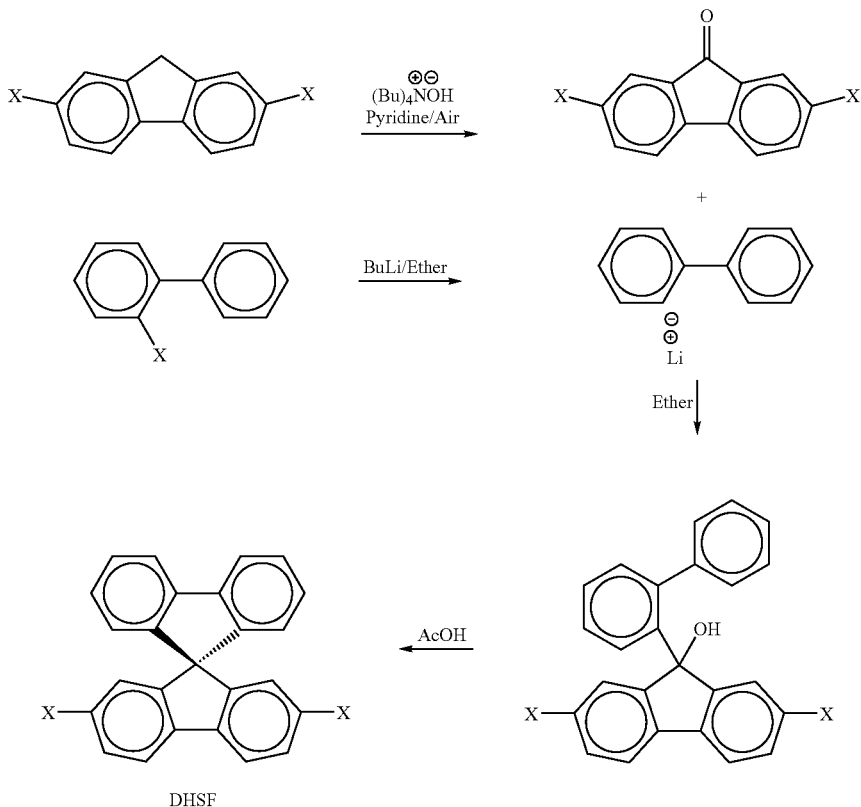

where X is I, Cl, and/or Br.

DHSF can be readily copolymerized with a 4,4'-dihalo-biphenyldisulfonic acid to form random, graded, and block poly(phenylene sulfonic acid) copolymers.

DHSF can also include sulfonic groups that provide for proton conductivity and, when a copolymer comprising DHSF is formed into a membrane, promote the passage of hydronium ions across the membrane. The sulfonic groups can be attached, for example, at the 1 and 8 position of DHSF to form respectively 2,7-dihalo-9,9'-spirofluoroene-1,8-disulfonic acid (DHSFSA) as shown below.

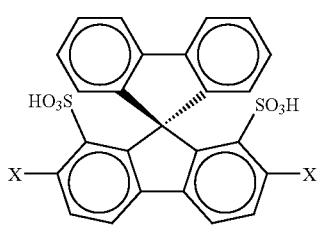

It will appreciated that the sulfonic groups can be attached at other positions on the DHSF structure as shown below.

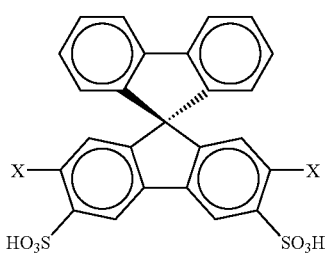

A 4-halobenzene-3-sulfonic acid moiety can also be added to each end of the DHSF to make a monomer shown below.

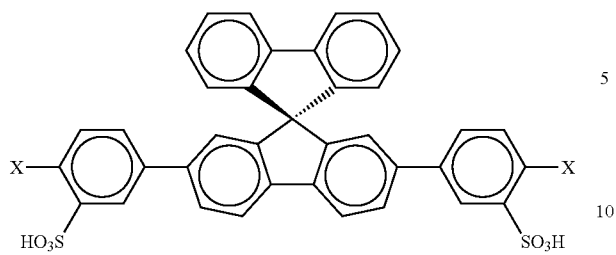

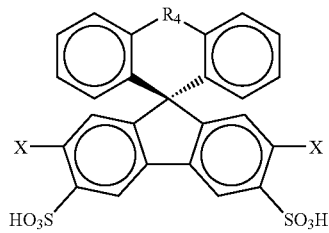

This monomer can readily copolymerize because the 4-halo (e.g., bromo) end much more reactive than the 1-halo end of DHSF. This monomer can be formed by reacting the boronic acid analogue of the above spirodifluorene with 1,4-dihalo benzene-2-sulfonic acid using the Suzuki reaction.

Other examples of bulky, cross-linkable comonomers having a similar structure to DHSF can also be copolymerized with the a 4,4'-dihalo biphenyl sulfonic acid to form random and block poly(phenylene sulfonic acid) copolymers. These similar structures include:

where X is a halogen (i.e., halo group), such as Br, Cl, and/or I, and $R_4$ is O, S, or $SO_2$.

An example of yet another bulky, cross-linkable comonomer that can be copolymerized with the a 4,4'-dihalobiphenyl sulfonic acid to form a random and block poly (phenylene sulfonic acid) copolymer can be formed by the following reaction scheme.

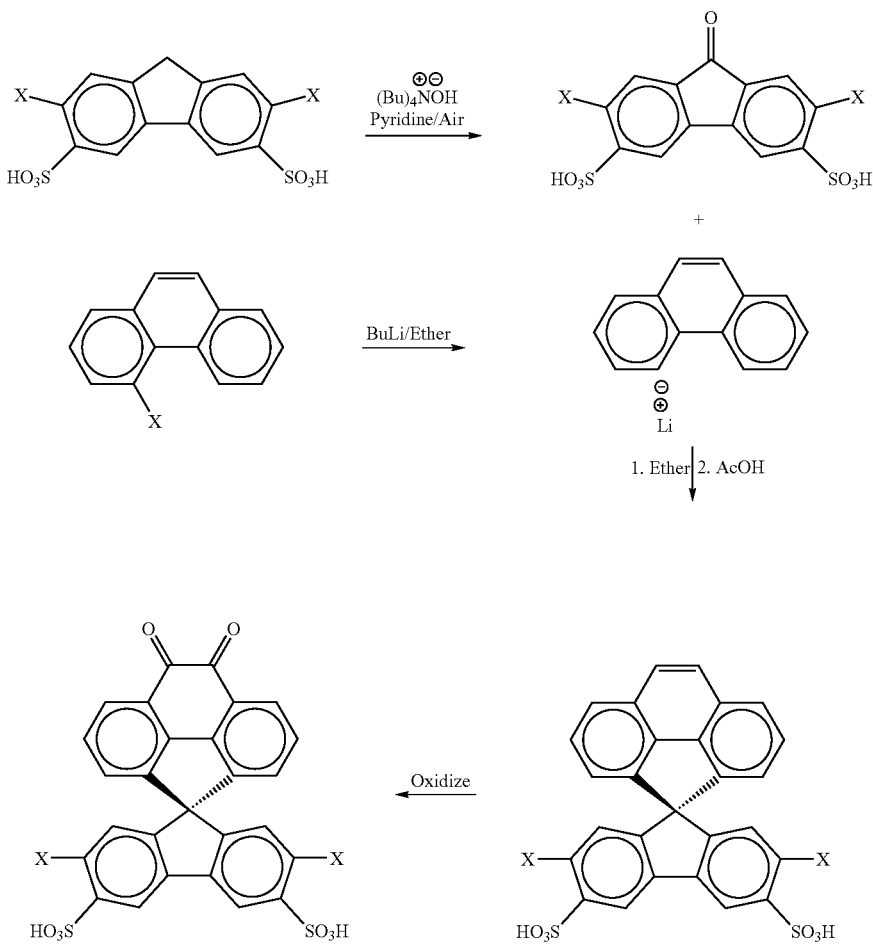

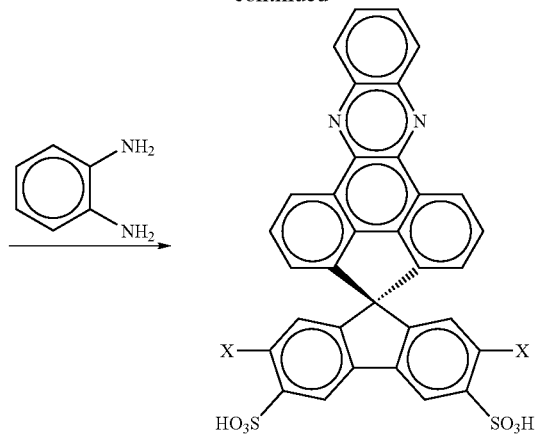

where X is a halogen (i.e., halo group), such as Br, Cl, and/or I.

The comonomer so formed when polymerized with 4,4'-dihalo-biphenylsulfonic acid can extend, for example, about 10 to about 13 angstroms from the backbone of the copolymer. The distance between adjacent polymers can then be, for example, about 13 angstroms to about 14 angstroms. This can create large gaps between the polymers. Hydrophobic association of the comonomer groups in the copolymer may cause three or four chains to aggregate and form a strand with a large free volume between the aggregated polymer chains. The distance between the copolymer chains can be, for example, about 20 angstroms to about 22 angstroms compared to a distance of about 10 angstroms for liquid crystal poly(phenylene sulfonic acid) polymers where no comonomer is used. The volume between the strands of copolymers can be at least about 4 times greater than the volume between polymer chains where no comonomer is used. This volume can allow about 11 water molecules to associate with each sulfonic acid group, which permits high proton conductivity when the copolymer is used as a PEM in an MEA. Additionally, the hydrophobic association can be strong enough to substantially mitigate swelling or contraction of the PEM with changes in relative humidity.

It will appreciated that in the preceding reaction scheme that the sulfonic groups can be attached at other positions on the comonomer. Further, it will appreciated that in the preceding reaction scheme other aromatic diamines, besides 1,2-phenylene-diamine, can be used to extend the length and/or increase the bulk of the comonomer.

The following reaction scheme illustrates formation of comonomer similar to comonomer in the preceding reaction scheme except 9,10-phenanthrenediamine is used instead of 1,2-phenylene-diamine.

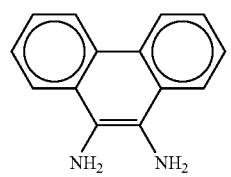

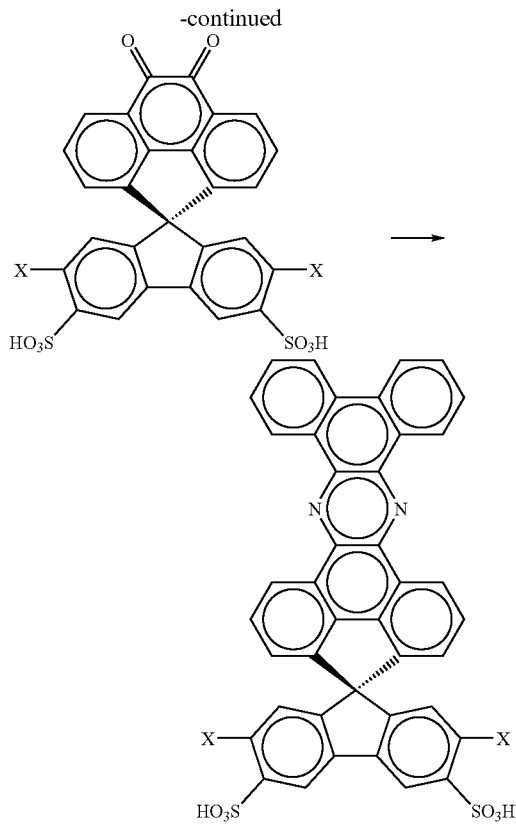

where X is a halogen (i.e., halo group), such as Br, Cl, and/or I.

The comonomer so formed using 9,10-phenanthrenediamine, can be polymerized with 4,4'-dihalo-biphenyl-disulfonic acid to form a random, graded, or block liquid, crystal poly(phenylene sulfonic acid) copolymer. The comonomer may extend, for example, about an additional 1.4 angstroms from the backbone of the copolymer compared to the previously described copolymer where 1,2-phenylene-diamine is used in forming the comonomer.

It will appreciated that as with the preceding comonomer the sulfonic acid groups can be attached at other positions on the comonomer. Further, it will be appreciated that other aromatic diamines, besides 9,10-phenanthrenediamine, can be used to extend the length and/or increase the bulk of the comonomer.

Moreover, it will appreciated that the diketone in the preceding reaction scheme can be reacted with dibenzyl ketones or analogous 1,3-aromatic substituted acetones to make a tetracyclone (e.g., 2,3,4,5-tetraphenyl cyclopentadienone). This can be subsequently reacted with an acetylene derivative to generate substituted benzenes. An example of one such monomer is shown below:

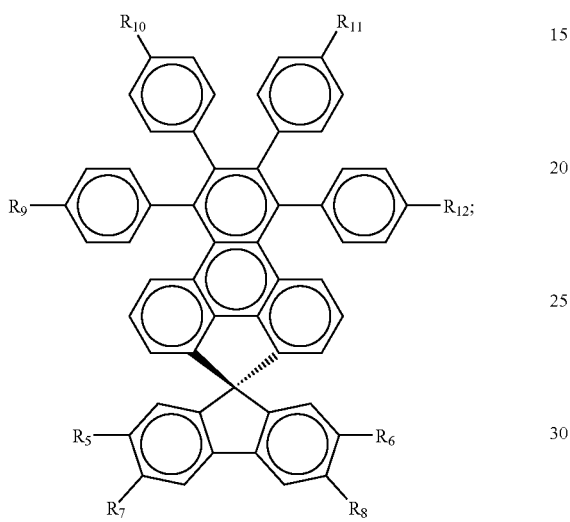

wherein $R_5$, $R_6$, $R_7$, $R_8$, $R_9$, $R_{10}$, $R_{11}$, and $R_{12}$ are defined as described below.

Other examples of comonomers that include bulky, angled, and/or cross-linkable groups and that can be used in forming a liquid crystal poly(phenylene sulfonic acid) copolymer in accordance with the present invention include the following:

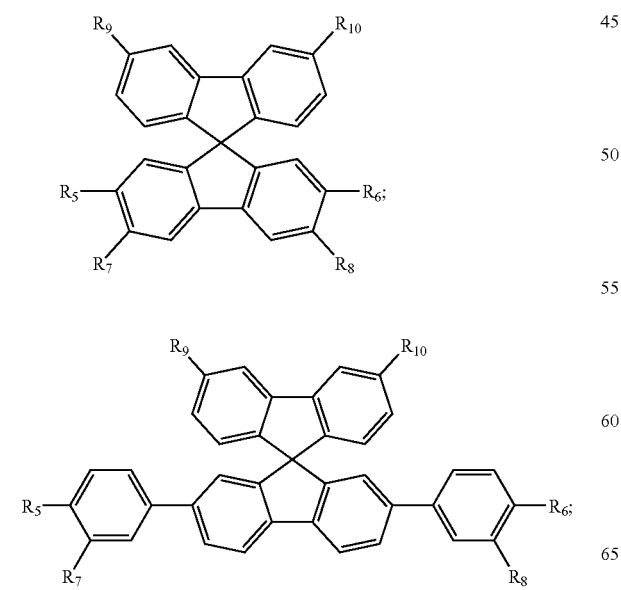

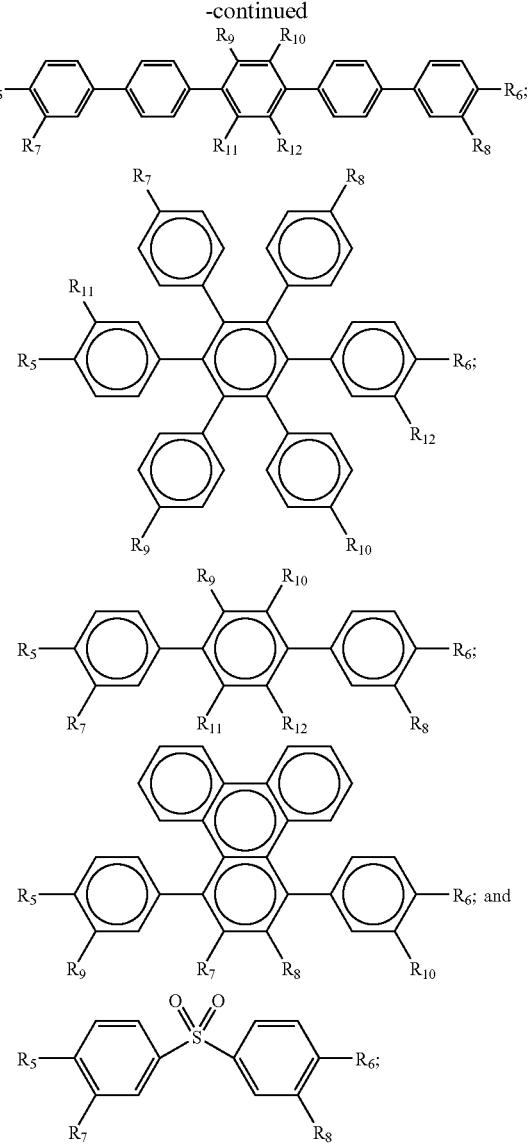

or mono-sulfonic acid or poly-sulfonic acid variations thereof; wherein $R_5$ and $R_6$ are Br, Cl, or I, and $R_7$, $R_8$, $R_9$, $R_{10}$, $R_{11}$, and $R_{12}$ each independently represent, for example, H, $SO_3H$, alkyl (methyl, ethyl, propyl, isopropyl, butyl, etc.),

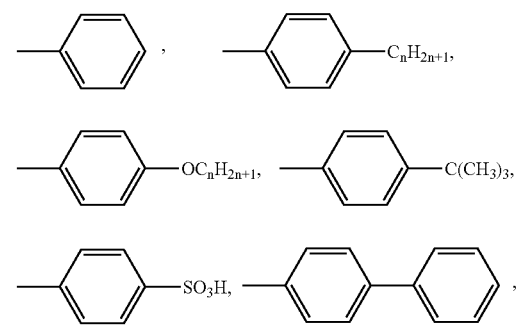

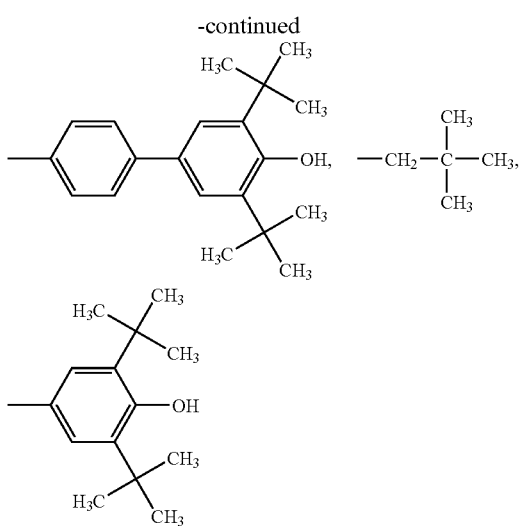

alkoxy (e.g., methoxy and ethoxy), alkyloxy, aroxy (e.g., phenoxy), alkylaryloxy, substituted or hetero-atom variations thereof, ethers thereof, or mono-sulfonic acid or poly-sulfonic acid variations thereof.

Other examples of comonomers that can be used in forming a liquid crystal poly(phenylene sulfonic acid) copolymer in accordance with the present invention include benzo-bisoxazole, bisthiazole and bisimidazole units linked to phenylene sulfonic acids or bearing a sulfonic acid on the central ring. Further possibilities are 1,5-naphthalenyl 2,6-disulfonic acid and the structure depicted below, which is made from diamino anthraquinone and 4-bromobenzamide.

prepared from a diamine selected from the group consisting of 1,4-p-phenylene diamine (PDA); 4,4'-(9 fluorenyl) dianiline (FDA), 4,4'-oxydianiline (ODA), 1,4-bis(4-aminophenyl)-2,3,5-triphenyl benzene ((3P)TDA), 1,4-bis(4-aminophenyl)-2,3,5,6-tetraphenyl benzene ((4P)TDA); 2,2'-dibenzoyl-benzidine (DBB), 1,4 bis-(4-aminophenyl)-2,3-di (biphenyl)-5,6-diphenyl benzene (DBPDPDA), 1,4-bis-(4-aminophenyl)-2,3,-di(2-naphthyl)-5,6-diphenyl benzene (DNDPDA), 1,1'-bis-(4-aminophenylene)-4,4'-(1,4-phenylene) bis-(2,6-diphenyl pyridinium tetrafluoroborate), 1,1'-bis-(4-aminophenylene)-4,4'-(1,4-phenylene) bis-(2,6-bis(4-methyl phenylene)pyridinium tetrafluoroborate), 1,1'-bis-(4-aminophenylene)-4,4'-(1,4-phenylene) bis-(2,6-bis (4-ethoxy phenylene) pyridinium tetrafluoroborate), 2',6',3'', 5''' tetra (R-phenyl) 4,1''''-diaza-pentaphenylene diamine (NHA [R=H]; NMA [R=CH$_3$], NEA [R=ethoxy]), 1,5-diaminonaphthalene (1,5-DAN); 2,6-diaminoanthraquinone (2,6-DAA); 1,5-diaminoanthraquinone (1,5-DAA), Dm-AP-NTCDI, tris(4-aminophenyl) methane (TAM); 2,2'-bis(trifluoro methyl)benzidene (TFMB), and 3,8-diamino-6-phenylphenanthridine (DAPP).

PDA, FDA, ODA, 1,5-DAN, TAM, and TFMB are commercially available compounds. (3P)TDA, (4P)TDA, DBPDPDA and DNDPDA are synthesized according to known procedures as described by Sakaguchi et al. in Polym. J., 1992, 24 (10), 1147, hereby incorporated by reference. NHA, NMA, and NEA are synthesized according to known procedures described by Spiliopoulis et al. in *Macromolecules*, 1998, 31,515, also hereby incorporated by reference.

DBB is synthesized via Ullmann coupling of 2-halo,-5-nitrobenzophenone and reduction of the nitro groups to amines.

Comonomers used in accordance with the present invention can be classified according to their structure and the

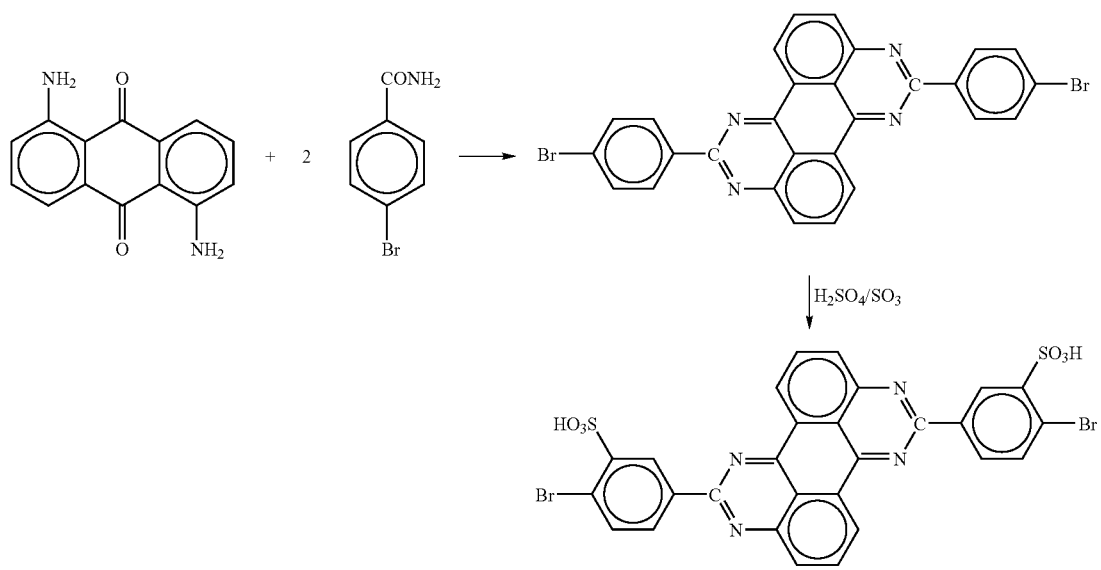

Additional examples of comonomers that include bulky, angled, and/or cross-linkable groups and that can be used in forming liquid crystal poly(phenylene sulfonic acid) copolymer in accordance with the present invention are described in U.S. Pat. No. 6,585,561, which is herein incorporated by reference. These monomers can include dihalo compounds location of the halo groups. Dihalo compounds prepared from FDA and ODA are angled comonomers, in that the dihalo groups are not in a linear arrangement.

Dihalo compounds prepared from DBB, (3P)TDA, (4P) TDA, DBPDPDA, DNDPDA, 1,1'-bis-(4-aminophenylene)-4,4'-(1,4-phenylene) bis-(2,6-diphenyl pyridinium tetrafluoroborate), 1,1'-bis-(4-aminophenylene)-4,4'-(1,4-phenylene) bis-(2,6-bis(4-methyl phenylene)pyridinium tetrafluoroborate), 1,1'-bis-(4-aminophenylene)-4,4'-(1,4-phenylene) bis-(2,6-bis(4-ethoxy phenylene)pyridinium tetrafluoroborate), NHA, NMA; NEA and 3,8-diamino-6 phenylphenanthridine (DAPP) are monomers having a linear chain, halo terminated at both ends, with bulky pendent groups attached to the chain.

Dihalo compounds prepared from 1,5 DAN, 2,6 DAA, 1,5 DAA, and Dm-APNTCDI are displacing comonomers that displace the polymer backbone laterally without changing its direction, such that sections or portions of the polymer chain are not necessarily coaxial, but are still co-linear, or substantially so. Displacing comonomers also serve to separate the polymer chains and create nanopores.

The comonomer can also be a dihalo compound prepared from a diamine disclosed in U.S. Pat. No. 6,586,561, including, for example:

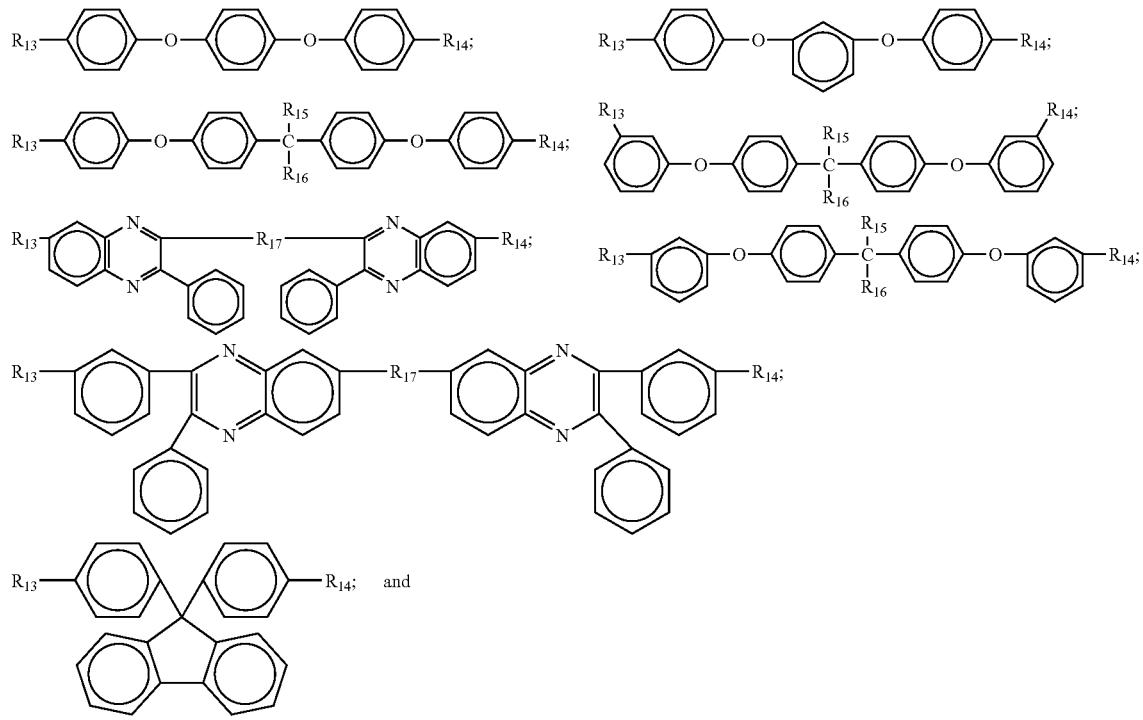

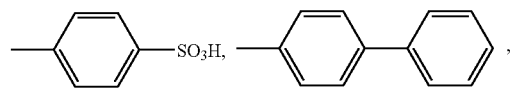

-continued

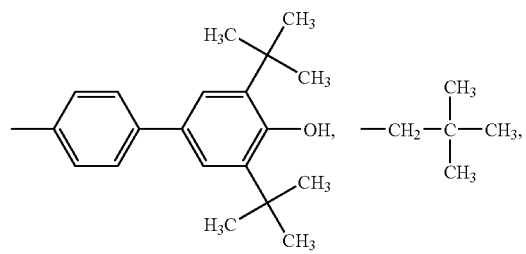

mono-sulfonic acid or poly-sulfonic acid variations thereof, and wherein $R_{13}$ and $R_{14}$ each independently represent Br, Cl, or I; where $R_{15}$ and $R_{16}$ each independently represent H, $SO_3H$, alkyl (methyl, ethyl, propyl, isopropyl, butyl, etc.),

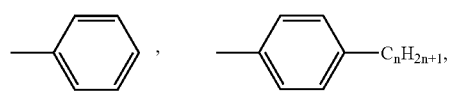

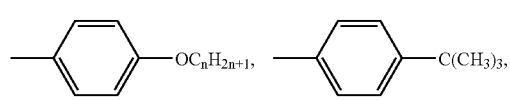

-continued

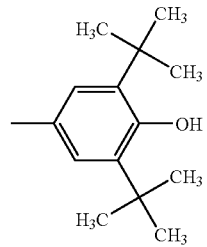

alkoxy (e.g., methoxy and ethoxy), alkyloxy, aroxy (e.g., phenoxy), alkylaryloxy, substituted or hetero-atom variations thereof, ethers thereof, or mono-sulfonic acid or polysulfonic acid variations thereof; and where $R_{17}$ can be, for example,

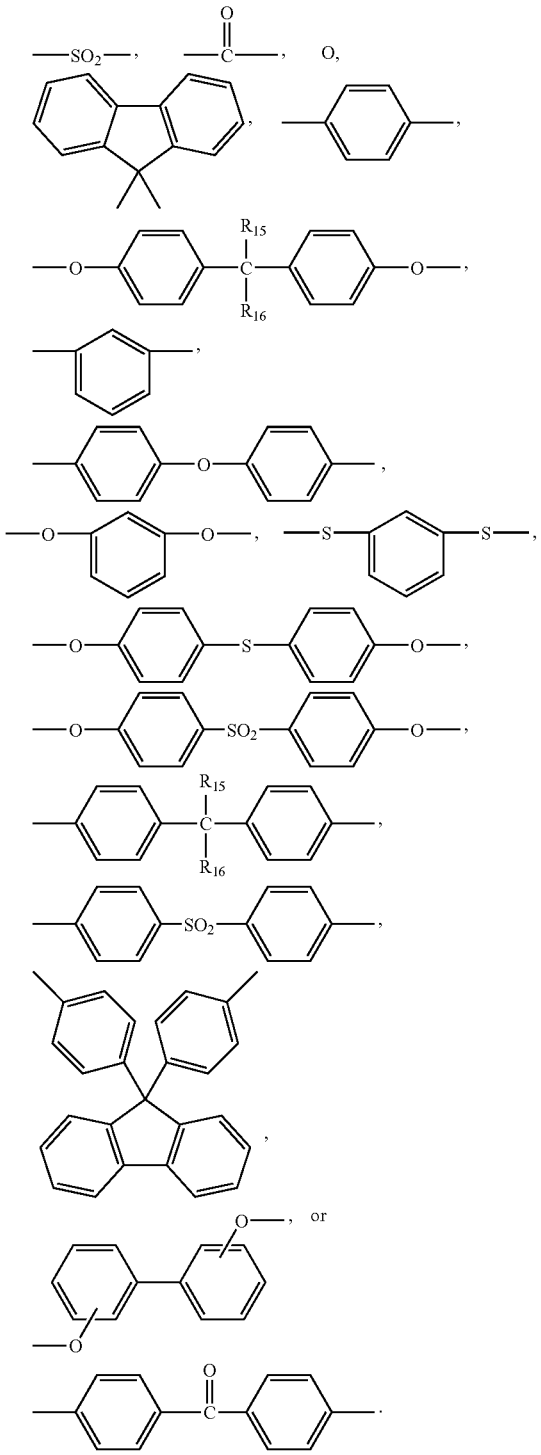

As will be appreciated, a wide array of comonomers can be used in forming the copolymers of the present invention. Potentially any comonomer can be used in forming the poly(phenylene sulfonic acid) copolymer as long as the hydrolytic stability of the copolymer is maintained and the comonomer does not adversely affect the properties of the resulting polymer (e.g., conductivity).

The poly(phenylene sulfonic acid) copolymers in accordance with the present invention can be formed in an Ullmann coupling reaction from 4,4'-dihalo-biphenyldisulfonic acids and a comonomer. It will be appreciated that the 4,4;-dihalo-biphenyldisulfonic acids can be copolymerized with the comonomer using other procedures as long as these other procedures are not inhibited by the sulfonic groups. Examples of these other approaches can include using different coupling reagents or catalysts, such as palladium (Pd), nickel (Ni), or nickel/zinc (Ni(0)/Zn), which are disclosed in Lemaire et al., Aryl-Aryl Bond Formation One Century After the Discovery of the Ullmann Reaction, Chem. Rev. 2002, 102, 1359-1469, herein incorporated by reference. It will be appreciated that yet other approaches can be used to polymerize the dihalide biphenylsulfonic acids.

The microstructure of the copolymer can be controlled so that a random copolymer to graded block copolymer is formed. A random copolymer when formed into PEM can have enhanced conductivity with high dimensional stability. Phase segregation should occur in a PEM formed from an ABA or $(-A-B-)_x$ block copolymer. As shown schematically in FIG. 1, the hydrophobic block aggregation of the block polymer should prevent any swelling of the PEM, while the rigid rod structure should prevent deswelling of the built-in free volume. The domains of the block copolymer could shear relatively easily and allow for elongation, as implied by FIG. 1.

Block copolymers comprising the poly(phenylene sulfonic acid) copolymers can be formed by several routes. For example, the base monomer (e.g., 4,4'-dihalo-biphenyldisulfonic acid) can be initially polymerized to form a polymer (e.g., poly(phenylene sulfonic acid)) with a low molecular weight. A comonomer in accordance with the present invention (e.g., 4,4'-dibromo-3,3'-di(tert-butyl)hydroxyphenylsulfonyl-biphenyl) can then be added to the low molecular weight polymer (e.g., poly(phenylene sulfonic acid)) and the reaction can be continued.

If the comonomer in accordance with the present invention (e.g., 4,4'-dibromo-3,3'-di(tert-butyl)hydroxyphenylsulfonyl-biphenyl) is less reactive than the base monomer (e.g., 4,4'-dihalo-biphenyldisulfonic acid), both the base monomer and the comonomer can be initially combined and reacted together. The first polymer formed (e.g., poly(phenylene sulfonic acid)) will comprise primarily the base monomer. As the polymer grows, the ends will become richer in the comonomer. This will give a graded block copolymer. Depending on the comonomer reactivity, a tri-block or multi-block polymer can be formed.

A chain stopper (i.e., chain terminator) can be added to the reaction of the base monomer and the comonomer to form a tri-block polymer. Where the base monomer is allowed to initially polymerize, the chain stopper can be added to the partially polymerized base monomer at the same time as the comonomer. Where both the base monomer and the comonomer are initially combined and reacted, the chain stopper can be added toward the end of the reaction, when a copolymer is already formed. The chain stopper can be, for example, 2-bromo benzene sulfonic acid, or similar compounds containing alkyl groups, including t-butyl, t-amyl, alkyl, adamantyl, etc. and adducts with phenyl, tert-butyl phenyl, hydroxyl or alkoxy phenyl, or di-(tert-butylhydroxy) phenyl) or its alkyl ether, as well as all the other monofunctional adducts shown above.

In accordance with yet another aspect of the invention, the sulfonic groups of the dihalo-biphenyldisulfonic acids can be protected during polymerization with the comonomer to optimize the polymerization reaction and mitigate reaction of the sulfonic acid groups. The sulfonic acid groups can be protected by transforming the sulfonic acid groups into sulfonate esters in an esterifcation reaction or by forming sulfonate salts with counterions that contain bulky (i.e., enhanced spatial dimension) or long chain hydrocarbons.

For example, as shown in the following reaction scheme, the sulfonic acid groups of 4,4'-dibromo-3,3'-biphenyldisulfonic acid, can be protected during polymerization with a comonomer to optimize the polymerization reaction.

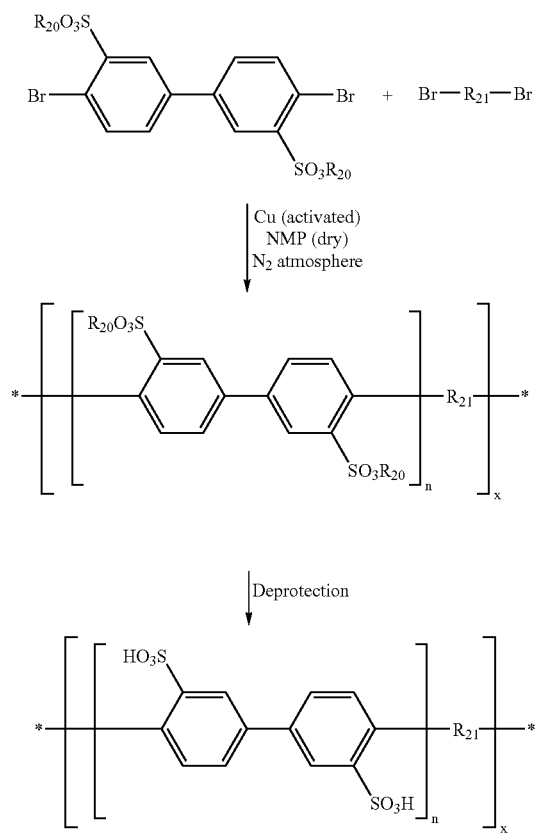

$R_{21}$ can be a bulky, angled and/or cross-linkable comonomer, such as 4,4'-dibromo-3,3'-biphenylsulfonyl-biphenyl, DHSF, or DHSFA, and $R_{20}$ can be a bulky or a long chain hydrocarbon (e.g., aryl groups and alkyl aryl groups) or a bulky or a long chain hydrocarbon counterion, such as quaternary ammonium counterions (e.g., pyridinium, 4-methyl pyridinium, n-(dimethylamino)-pyridinium, benzyltrimethyl ammonium (BTMA), tribenzylmethyl ammonium, and di(tert-butyl)dimethyl ammonium and their phosphonium analogues. It will be appreciated that other bulky or long chain counterions can also be used to form a sulfonic ester in accordance with the present invention. It will also be appreciated that other bulky, angled, and/or cross-linkable comonomers can be used.

Protecting the sulfonic acid groups of the dihalo-biphenyldisulfonic acids during polymerization with the comonomer can potentially increase the molecular weight of the resulting poly(phenylene sulfonic acid) copolymers so that free standing films of the poly(phenylene sulfonic acid) polymers can be readily cast.

The copolymers of the dihalo-biphenydisolfonic acid monomer with bulky, angled and/or cross-linkable comonomers so formed can be cast from water (if soluble in water) and/or a variety of polar organic solvents to form films. This allows the copolymers to be directly cast on electrodes as a PEM in membrane electrode assembly (MEA) processing for lower power micro-fuel cells. Many poly(phenylene sulfonic acid) copolymers have a lower a proton conductivity than the poly(phenylene sulfonic acid) homopolymers at high humidity, but result in films with higher conductivities at low humidity.

The poly(phenylene sulfonic acid) copolymers can be chemically modified, as described above, to incorporate bulky side groups and/or cross-linkable groups. The bulky side groups and/or cross-linkable groups can improve the dimensional stability of the poly(phenylene sulfonic acid)s and render the poly(phenylene sulfonic acid)s substantially water insoluble. The bulky side groups and/or cross-linkable groups can also have a geometry that results in the separation of adjacent polymer molecules from one another. Such displacement creates additional regions of access or nanopores along the respective polymer chains. The regions of access, nanopores, or channels along the polymer chains expose sulfonic acid groups along the backbone of respective polymer groups. The controlled architecture of these materials allows them to hold water strongly and to retain a relatively high conductivity even at low humidity.

The bulky and/or cross-linkable side groups can be incorporated onto the backbone of the poly(phenylene sulfonic acid) copolymer via a sulfone formation reaction. The bulky and/or cross-linkable groups can include, for example, tert-butyl groups, tert-butylalkyl groups, di(tert-butyl)phenyl, di(tert-butyl)hydroxyphenyl, tert-butylaryl groups, long chain alkyl groups, and, 1,3,5-triphenyl benzene, frypticene, and tetracylene, as well as other molecules contain aryl groups or other cross-linkable groups, and ethers thereof.

It will be appreciated that although only one comonomer is shown being reacted with the base monomer in the foregoing reactions, it is possible to use one, two, three or more, and generally any combination of the aforementioned monomers to generate specific properties in the liquid crystal polymer so formed. It will also be appreciated that although the base monomer that is reacted with the comonomer comprises a biphenyl monomer, the base monomer could be di-halo benzene, di-halo naphthalene, di-halo triphenylene, di-halo phenanthrene, or other di-halo aryl monomer. For the di-halo phenyl and napthyl analogues, the sulfonic acid placement in the final polymer may be random rather than symmetric as it is for the biphenyl analogues.

Figure 2:
FIG. 2 is a microphotograph at 500 times magnification illustrating a 15% solution of poly(phenylene sulfonic acid) PPSA in DMSO (0.3 M LiCl), after shearing.

The rigid, rod liquid crystal polymers so formed in accordance with the present invention can organize as nematic liquid crystals. This is illustrated in FIG. 2, which is a photograph showing the nematic structure of a 15% solution of poly(phenylene sulfonic acid) in DMSO. Because of the liquid crystal nematic organization, liquid crystal polymer molecules in cast films are parallel to the surface of the film. This restricts swelling of the film in directions parallel to the film. This also provides opportunities to modify many important properties of films, such as free volume, with consequent water retention and conductivity, by small changes in the liquid crystal polymer structure.

The liquid crystal polymers may also form aggregates or micelles that have a substantially planar structure with sulfonic acid groups covering the planar structure surface.

Molecules of water can then be trapped by the sulfonic groups between adjacent micelles. Additionally, because of their liquid crystal structure, films formed from the polymers of the present invention are substantially MeOH impermeable. For example, a 20 μ thick film was at least 1000 times more selective than NAFION 117. A 40 μ thick film would be over a million times more selective.

For polymer electrolyte membrane (PEM) applications, it may be desirable to incorporate the liquid crystal polymer in accordance with the present invention into an electrochemically inert matrix to improve the mechanical stability of the liquid crystal polymer. The electrochemically inert matrix can provide mechanical support for a film of the liquid crystal polymer. Mechanical support can reinforce the film and allow for higher elongations of the film. The electrochemically inert matrix can comprise, for example, poly(vinylidene fluoride) (PVDF), polytetrafluorethylene (PTFE), or polychlorotrifluoroethylene (CTFE). Alternatively, other matrix materials can be substituted for, or blended or copolymerized with PVDF, PTFE, or CTFE.

By way of example, a PEM comprising a matrix incorporated with the liquid crystal polymer can be formed by initially selecting a membrane composed of a highly expanded inert polymer (e.g., PVDF). Membranes are commercially available from Waters Corporation. The membrane can then be impregnated with a solution of the liquid crystal polymer. Alternatively, an inert polymer, such as PVDF, and the liquid crystal polymer can be mixed in a solvent, such as DMF or DMAc, which is capable of dissolving both the liquid crystal polymer and the inert polymer and then cast to form the membrane.

The following examples are included to demonstrate various aspects of the invention. Those skilled in the art should, in light of the present disclosure, appreciate that many changes can be made in the specific aspects which are disclosed and still obtain a like or similar result without departing from the spirit and scope of the invention.

EXAMPLES

Design and Optimization of the Polymerization Approach

The 4,4'-dihalo-3,3'-biphenyldisulfonic acids and 4,4'-dihalo-2,2'-biphenyldisuflonic acids were each polymerized using an Ullmann coupling reaction to determine the reaction conditions which optimized the molecular weight for the respective polymers. Specifically, the sulfonic acids of 4,4'-dibromo-3,3'-biphenyldisulfonic acid and 4,4'-diiodo-2,2'-biphenyldisulfonic acids were each protected with various protective groups and polymerized in dry NMP within a nitrogen atmosphere, using copper mediated coupling, at 140° C. (i.e., an Ullman coupling reaction). The intrinsic viscosities of the polymers were measured and compared. As discussed previously, the intrinsic viscosity of the resulting polymer is indicative of its molecular weight. That is, the higher the intrinsic viscosity, the higher the molecular weight. A comprehensive discussion of intrinsic viscosity and its measurement and calculation is provided in the Polymer Handbook, J. Brandup, et al., Fourth Edition, 1999, Section VII, herein incorporated by reference. The results of the various polymerization reactions are listed in Table 1.

| R | Intrinsic Visc. (dl/g) DBBS 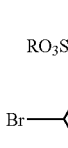 | Intrinsic Visc. (dl/g) DIIP  |
|---|---|---|
| 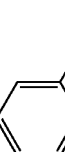 | 0.07 | 0.08 |
| 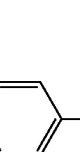 | 0.31 | 0.2 |
|  | 0.61 | 0.16 |

Table 1 indicates that sulfonic acid groups of 4,4'-dibromo-3,3'-biphenyldisulfonic acid protected with benzyltrimethyl ammonium counterion yielded a poly(phenylene sulfonic acid) polymer with the highest intrinsic viscosity for this series of protective agents and thus the highest molecular weight. Additionally, poly(phenylene sulfonic acids) polymers prepared from 4,4'-dibromo-3,3'-biphenyldisulfonic acid generally had higher intrinsic viscosities than poly(phenylenesulfonic acid) polymers prepared from 4,4'-diiodo-2,2'-biphenyldisulfonic acids.

Structural Characterization

Figure 3:
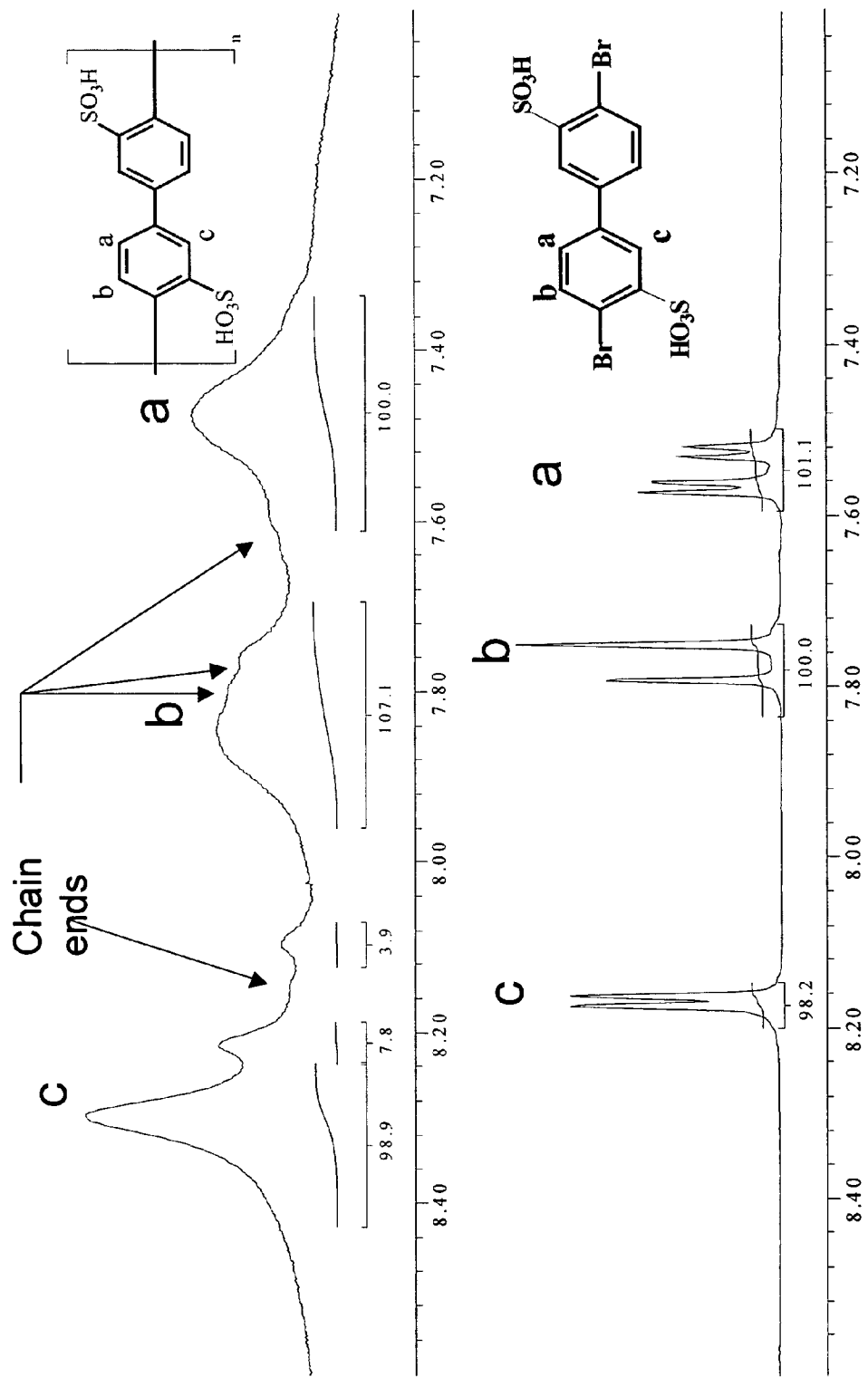
FIG. 3 illustrates NMR plots of 4,4'-dibromo-3,3'-biphenylsulfonic acid and poly(phenylene sulfonic acid) in accordance with the present invention.
Figure 4:
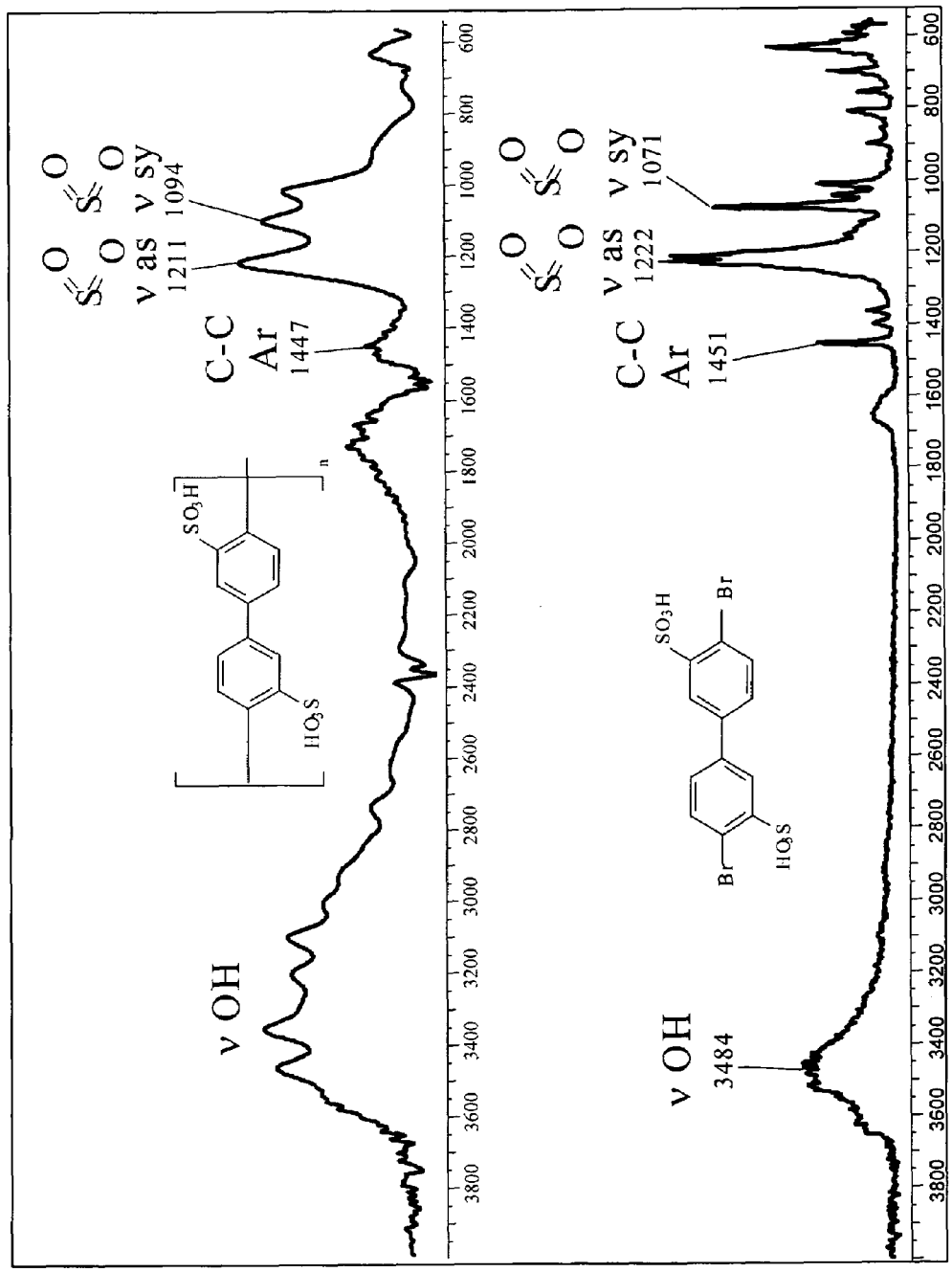
FIG. 4 illustrates FTIR plots of 4,4'-dibromo-3,3'-biphenylsulfonic acid and poly(phenylene sulfonic acid) in accordance with the present invention.

The structure of 4,4'-dibromo-3,3'-biphenyldisulfonic acid monomer and the poly(phenylenesulfonic acid) homopolymer formed by such polymerization of 4,4'-dibromo-3,3'-biphenyldisulfonic acid monomer was confirmed by NMR analysis and FTIR analysis as shown in FIGS. 3 and 4, respectively. The NMR analysis indicates that the position of the hydrogens on the phenylene ring of the poly(phenylenesulfonic acid) polymer correspond to the position of the hydrogens on the phenyl ring of 4,4'-dibromo-3,3'-biphenyldisulfonic acid. This indicates that the sulfonic acid groups of the polyphenylene sulfonic acid groups are in the ortho position to each other on the phenylene groups. This is confirmed by FTIR analysis, which indicates the relative position of the sulfonic groups on the poly(phenylene sulfonic acid)corresponds with the position of the sulfonic groups on the 4,4'-dibromo-3,3'-biphenyldisulfonic acid monomer. The polymer from the 4,4'-diiodobiphenyl-2,2'-disulfonic acid has the same chemical structure as that from the dibromo-3,3'-disulfonic acid monomer.

Evaluation of Conductivity and Water Absorption of Polymer Membranes

The proton conductivity of films of poly(phenylene sulfonic acid) polymers formed from 4,4'-dibromo-3,3'-biphenyldisulfonic acid monomers was measured and compared with the proton conductivity of NAFION.

Proton conductivity was measured using a four point probe technique with a BC2000 potentiostat. Polymer samples were enclosed in constant relative humidity plastic bottles using LiCl solutions at different concentrations to control relative humidity. Conductivities of the poly(phenylenesulfonic acid polymers) and NAFION were measured at 15%, 35%, 50%, and 75% relative humidity at, respectively, 25° C., 50° C., and 75° C. The results are shown in Table 2 and FIG. 5.

TABLE 2

| | Temperature | | |
|---|---|---|---|
| | 25° C. | 50° C. | 75° C. |
| Conductivity DBBS-Pol (S/cm), 15% RH | 0.0023 | 0.0040 | 0.0081 |
| Conductivity NAFION* (S/cm), 15% RH | 0.00008 | 0.00008 | 0.00008 |
| Conductivity DBBS-Pol (S/cm), 35% RH | 0.010 | 0.025 | 0.048 |
| Conductivity NAFION* (S/cm), 35% RH | 0.004 | 0.004 | 0.004 |
| Conductivity DBBS-Pol (S/cm), 50% RH | 0.019 | 0.045 | 0.086 |
| Conductivity NAFION* (S/cm), 50% RH | 0.01 | 0.01 | 0.01 |
| Conductivity DBBS-Pol (S/cm), 75% RH | 0.080 | 0.140 | 0.270 |
| Conductivity NAFION* (S/cm), 75% RH | 0.03 | 0.03 | 0.03 |

*NAFION conductivity obtained from literature.

Figure 5:
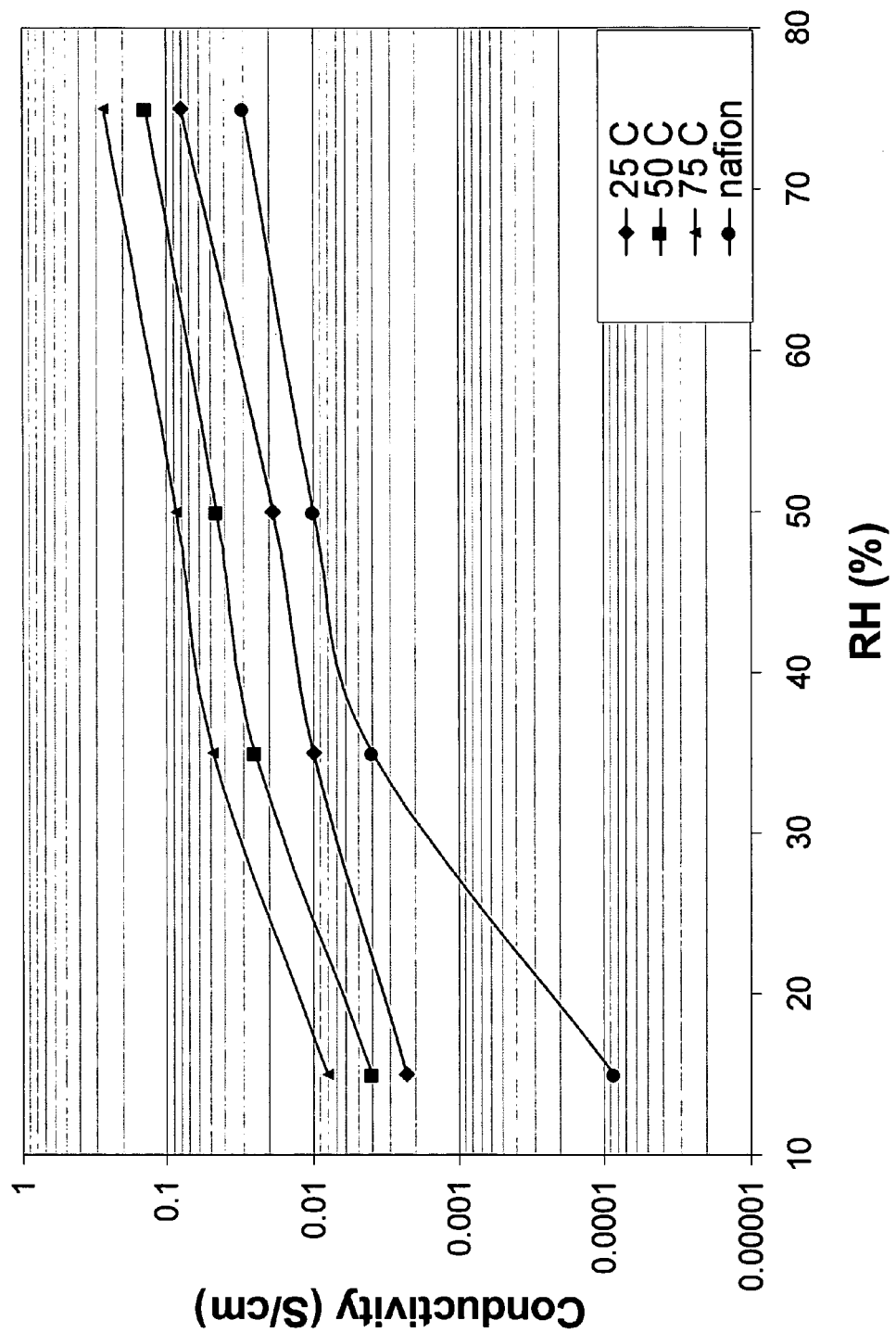
FIG. 5 is a graphical representation of data provided in Table 2 and compares the conductivity of a poly(phenylene sulfonic acid) homopolymer in accordance with the present invention with NAFION.

Table 2 and FIG. 5 show that a poly(phenylene sulfonic acid) homopolymer formed from 4,4'-dibromo-3,3'-biphenyldisulfonic acid monomers according to the present invention exhibits improved conductivity compared to NAFION over a wide range of temperatures and over a wide range of relative humidities. The conductivity of NAFION at a select relative humidity remains approximately constant as the temperature increases, while the conductivity of the poly (phenylenesulfonic acid) polymer, which is significantly higher than NAFION at even the lowest temperature tested (i.e., 25° C.) increases with increasing temperature. Table 2 also shows that the poly(phenylene sulfonic acid) polymer formed from 4,4'-dibromo-3,3'-biphenyldisulfonic acid monomers according to the present invention exhibits improved conductivity compared to NAFION over the full range of relative humidity.

Table 3 shows the water absorption of a poly(phenylene sulfonic acid) polymer formed from 4,4'-dibromo-3,3'-biphenyldisulfonic acid monomers according to the present invention compared to NAFION through a range of relative humidity using the weighing method.

TABLE 3

| | Molecules of water absorbed per sulfonic acid ($\lambda$) | |
|---|---|---|
| R.H. (%) | DBBS-Pol | NAFION |
| 35 | 4.8 | 2.7 |
| 50 | 5.8 | 3.4 |
| 75 | 7.6 | 5.6 |

Table 4 shows the dimensional changes from 20% relative humidity for a poly(phenylene sulfonic acid) polymer formed from 4,4'-dibromo-3,3'-biphenyldisulfonic acid monomers according to the present invention.

TABLE 4

| Change in | Relative Humidity | | |
|---|---|---|---|
| dimensions (%) | 35% | 50% | 75% |
| $\Delta x$ | 2 | 3 | 5 |
| $\Delta y$ | 3 | 4 | 5.5 |
| $\Delta z$ | 33 | 46 | 80 |

As is readily apparent from Table 4, the dimensional changes along the x and y axis are minimal compared to the dimensional changes along the z axis. This indicates that the molecules lie parallel to the film surface. As the relative humidity increases from 20% to 75%, the absorbed water molecules only swell the film in the Z direction since the rigid rod molecules prevent swelling in the X and Y directions. The absorbed water forces the chains apart in the Z direction, generating channels for ion conductivity.

Table 5 shows the dimensional changes for copolymer films conditioned at 100% relative humidity, after equilibrating at 22% relative humidity.

TABLE 5

| Grafting group | Amount grafted (mole % of total acid) | $\Delta x$ (%) | $\Delta y$ (%) | $\Delta z$ (%) |
|---|---|---|---|---|
| Biphenyl* | 10 | 2 | 2 | 45 |
| Biphenyl* | 20 | 1 | 1 | 35 |
| Biphenyl* | 55 | | | 15 |
| t-Butylbenzene | 5 | 0 | 1 | 85 |

TABLE 5-continued

| Grafting group | Amount grafted (mole % of total acid) | Δx (%) | Δy (%) | Δz (%) |
|---|---|---|---|---|
| t-Butylbenzene | 25 | 1 | 2 | 50 |
| Di-t-butylphenol | 5 | 0 | 0 | 50 |

*after crosslinking at 200° C.

As is readily apparent from Table 5, the dimensional changes for the copolymers along the x and y axes are minimal compared to the dimensional changes along the z axis, showing that all chains lie parallel to the film surface. The stability of the X and Y dimensions could be a desired property when designing an MEA for incorporation into a fuel cell.

Determination of Methanol Permeability in Polymer Electrolytes

Table 6 shows the methanol permeability at 125° C. and at pressures of 248 Torr and 392 Torr of a poly(phenylene sulfonic acid) polymer formed from 4,4'-dibromo-3,3'-biphenyldisulfonic acid monomers according to the present invention. Methanol permeability was measured using one chamber containing methanol vapor at a predetermined pressure.

TABLE 6

| Methanol Pressure (Torr) | Sorption g methanol/g polymer | Sorption Coefficient moles of methanol per (cm³ film × Torr) | Diffusion Coefficient cm²/s |
|---|---|---|---|
| 248 | 0.0020 | $2.5 \times 10^{-7}$ | Ca. $1 \times 10^{-7}$ |
| 392 | 0.0035 | $2.8 \times 10^{-7}$ | Ca. $1 \times 10^{-7}$ |

The results in Table 6 show that a poly(phenylene sulfonic acid) polymer formed from 4,4'-dibromo-3,3'-biphenyldisulfonic acid monomers according to the present invention exhibits very little permeability to methanol. These results together with water sorption results (not shown), show that water was preferentially absorbed over methanol. A diffusion rate one tenth that of water was estimated. However, these experiments were performed using a single permeant, water or methanol. When a competitive experiment was run, described below, the membrane was essentially impermeable to methanol.

Figure 6:
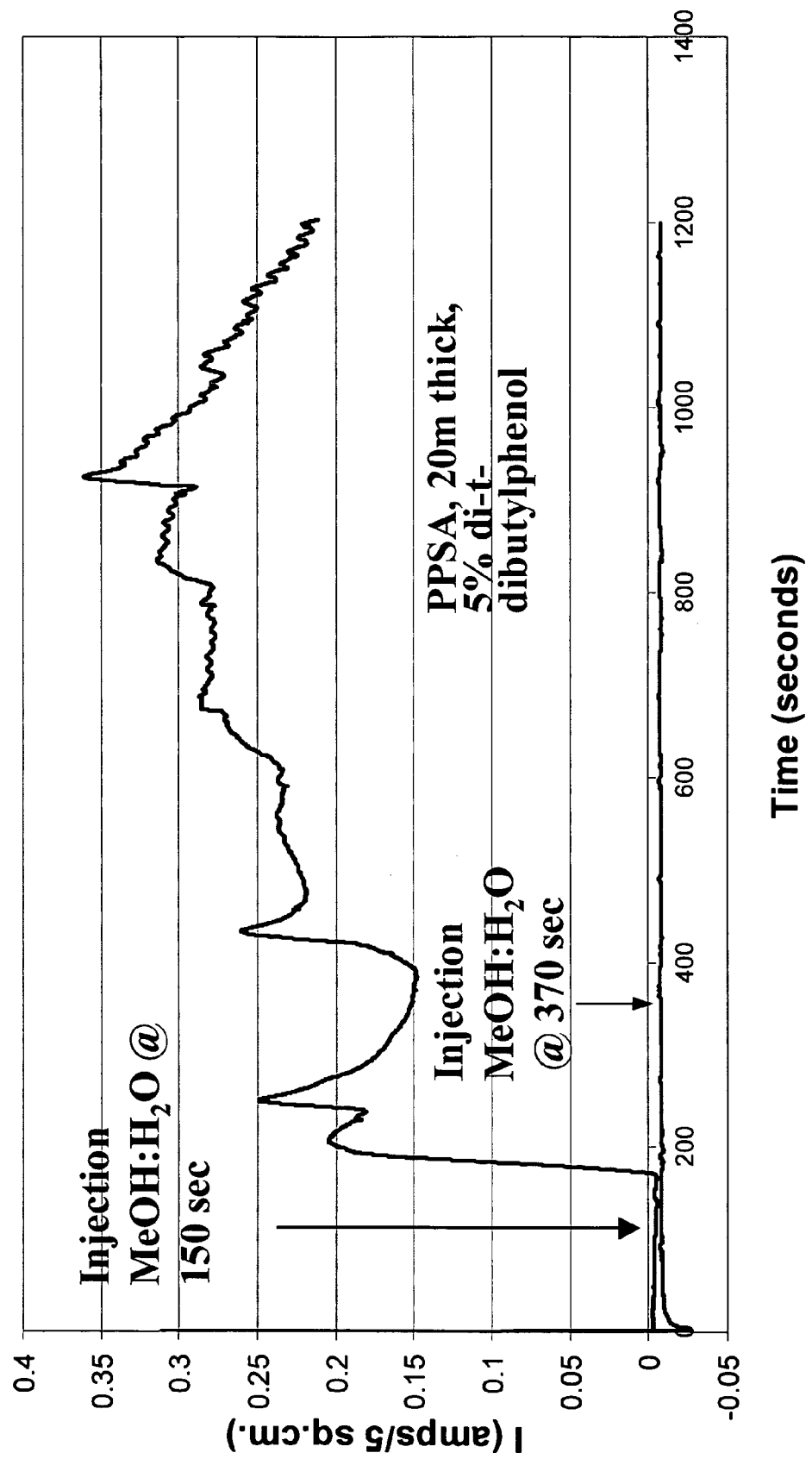
FIG. 6 illustrates plots of methanol permeation at 105° C., gas ratio 2 MeOH/1 $H_2O$, for PPSA and NAFION 117.

FIG. 6 illustrates methanol permeability of a NAFION 117 film and a poly(phenylene sulfonic acid) film with 5% di-(tert-butyl) hydroxyphenyl groups. The films each had an area of about 5 cm²; the poly(phenylene sulfonic acid) film had a thickness of about 20 μm and the NAFION 117 film had a thickness of 175 μm. A membrane formed from the poly(phenylene sulfonic acid) and the NAFION 117 were each individually used to separate two chambers, one chamber containing a 2:1 methanol:water vapor phase while the second chamber had an argon gas stream flowing through it. Methanol that permeated the membrane was transferred by the argon stream to the fuel chamber of a measuring fuel cell. An impedance spectrometer measured the current generated in the measuring fuel cell. The measured current as a function of time for films of NAFION 117 and the poly (phenylenesulfonic acid) are shown in FIG. 6. FIG. 6 shows that the poly(phenylene sulfonic acid) film at one eighth the thickness was at least 1000 times less permeable to MeOH than was NAFION 117.

Thermal Stability

Figure 7:
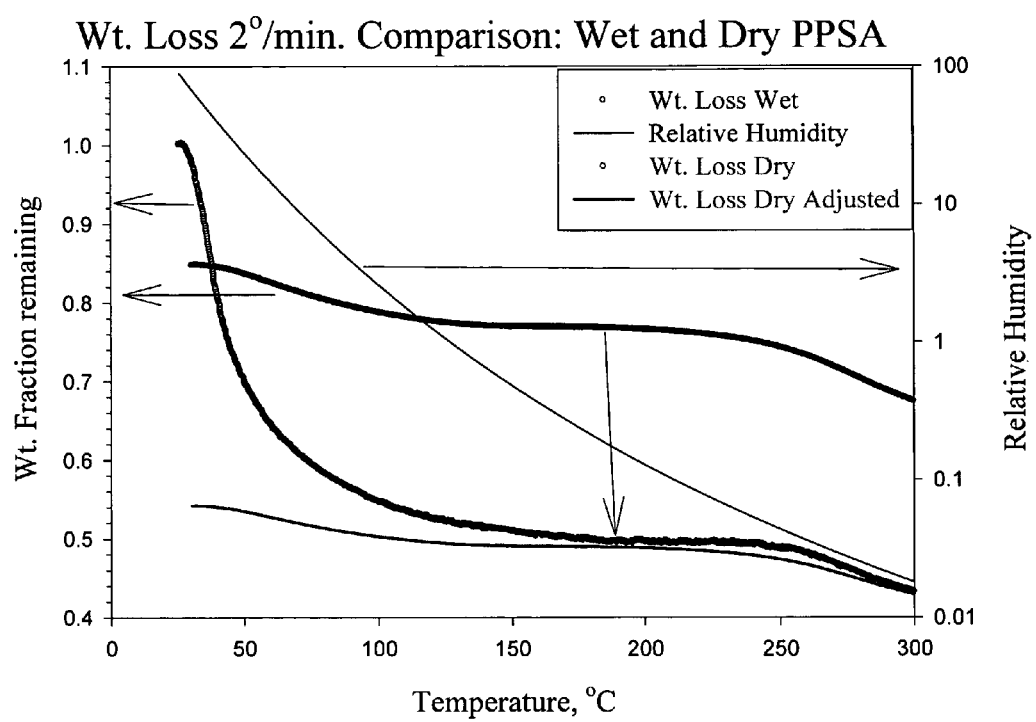
FIG. 7 ilusrates a thermogravimetric analysis plot of a poly(phenylene sulfonic acid) homopolymer in accordance with the present invention.

FIG. 7 illustrates a thermogravimetric analysis plot of a poly(phenylene sulfonic acid) homopolymer in accordance with the present invention. The heavy green curve shows PPSA that was conditioned at 22% RH and then swept with dry nitrogen for one hour before starting the TGA. The blue curve shows a PPSA that was conditioned at 75% RH and then heated, maintaining the flow of wet nitrogen. The thin green curve shows the dry PPSA weight normalized to that of the wet PPSA run so that the remaining weights were identical for both at 180° C. At 2° C. per minute, the dry TGA run shows a further weight drop starting at about 200° C. The drop in the wet TGA run is raised to about 240° C., an increase of 40° C. The RH where the wet drop-off starts is about 0.05%. This can be interpreted as either: (1) the polymer in the wet run has a small amount of water but that is sufficient to inhibit degradation up to 240° C., or (2) both polymers retain some water at these high temperatures. The last water starts evaporating at 180° C. in the dry run, but even the very low RH is sufficient to keep the water in the polymer up to 240° C. There is a point of inflection at about 275° C. in both runs that may indicate the start of degradation at this heating rate. Mass spectrographic data show that evolution of $SO_2$ starts at about 300° C.

Proton Conductivity of Water Insoluble Polymer Membranes

Figure 8:
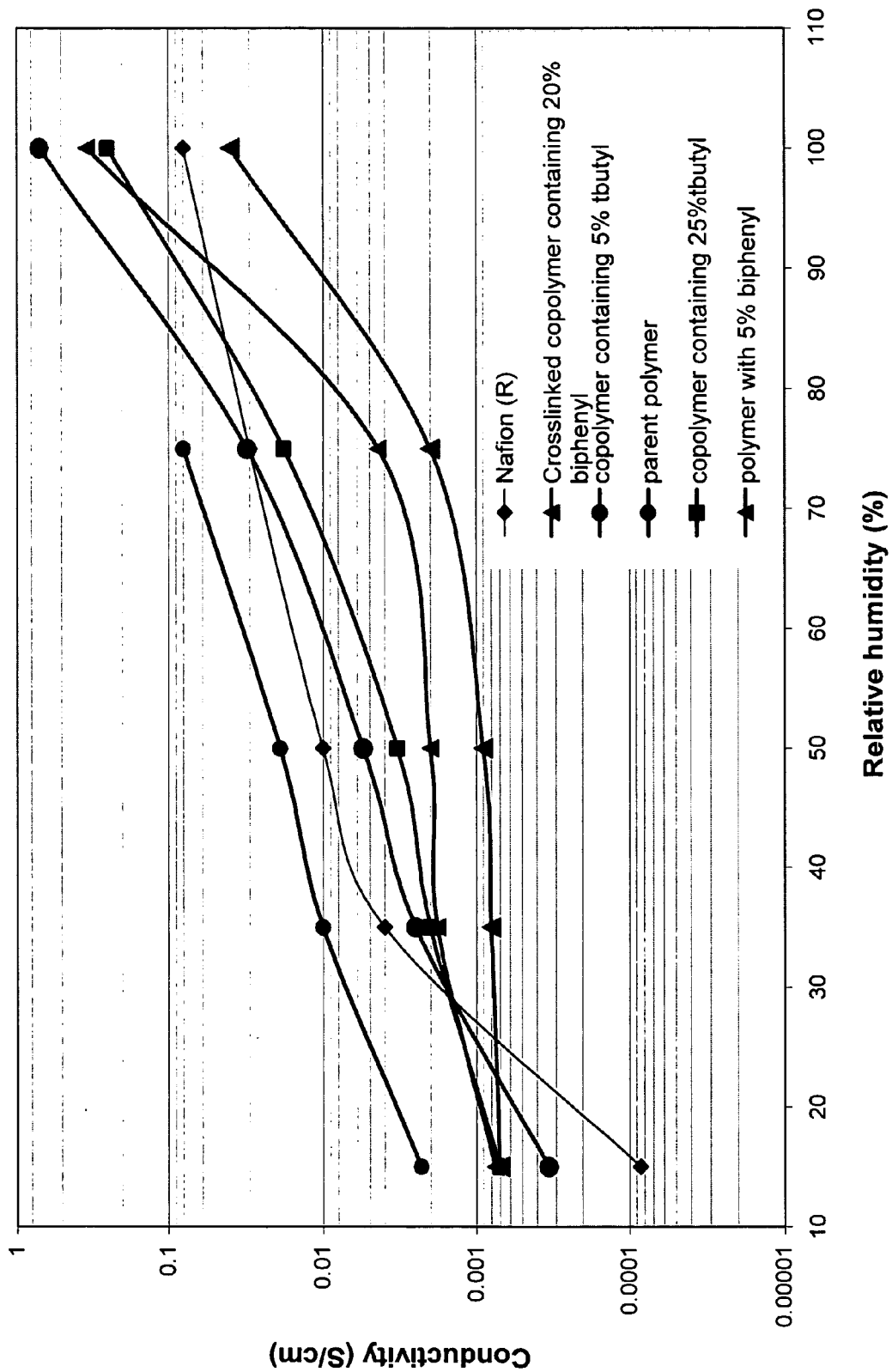
FIG. 8 is a graph that compares the proton conductivity as a function of relative humidity and temperature for NAFION, a crosslinked poly(phenylene sulfonic acid) copolymer containing 20% biphenyl, a poly(phenylene sulfonic acid) copolymer containing 5% tert-butylphenyl, a poly(phenylene sulfonic acid) homopolymer, a poly(phenylene sulfonic acid) copolymer containing 25% tert-butylphenyl, and a poly(phenylene sulfonic acid) copolymer containing 5% biphenyl.

The proton conductivity (Seimens/cm) as a function of relative humidity at 25° C. was plotted (FIG. 8) for NAFION, a crosslinked poly(phenylene sulfonic acid) copolymer containing 20% biphenyl, a poly(phenylene sulfonic acid) copolymer containing 5% tert-butyl, a poly (phenylene sulfonic acid) homopolymer, a poly(phenylene sulfonic acid) copolymer containing 25% tert-butyl, and a poly(phenylene sulfonic acid) copolymer containing 5% biphenyl. FIG. 8 shows that both these bulky and crosslinked copolymers have much lower conductivity than the homopolymer. The conductivity dependence on relative humidity suggests that the membrane structure de-swells rapidly as humidity drops unit it approaches its built-in free volume. It then holds the remaining water tightly.

Figure 9:
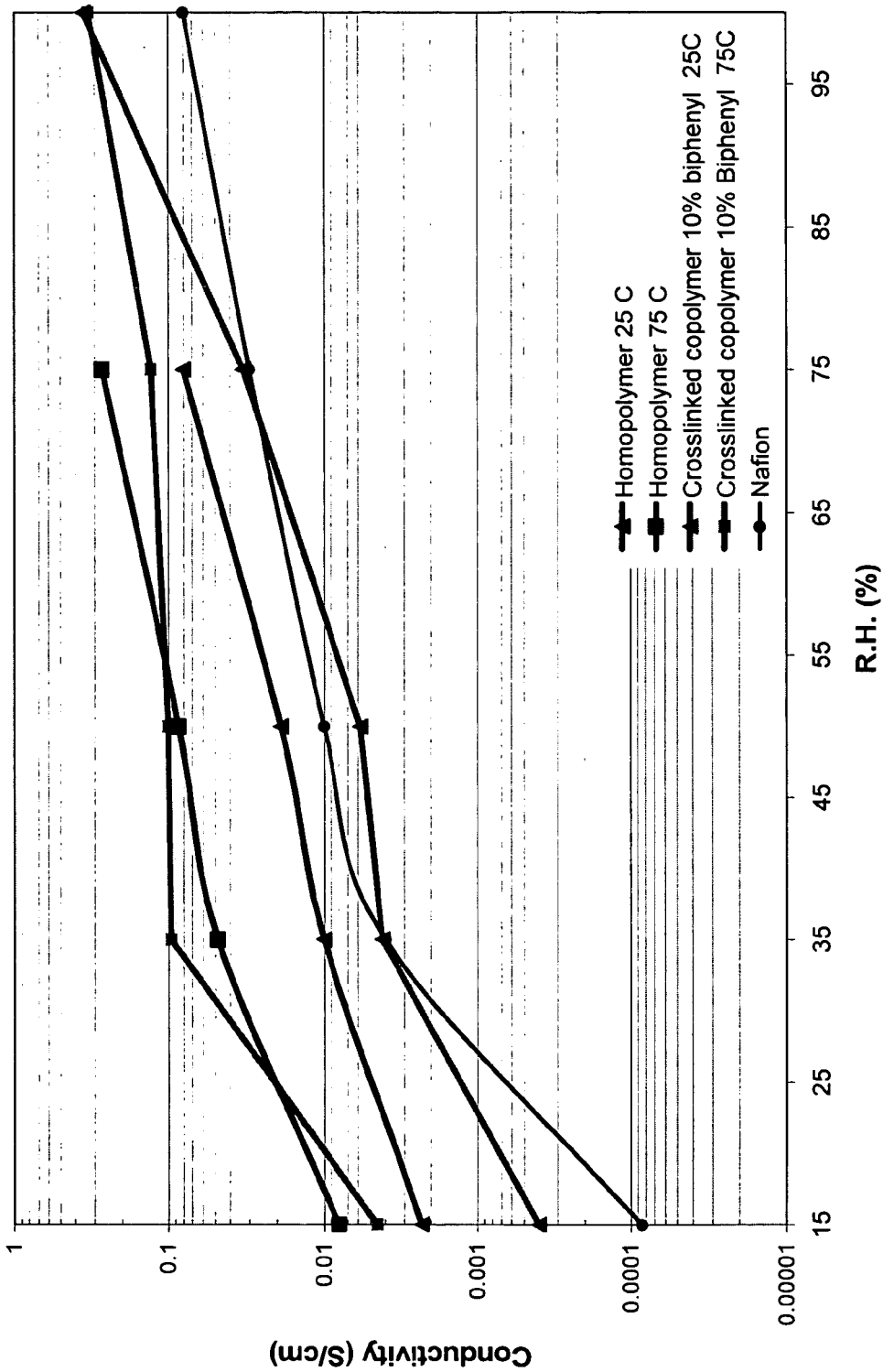
FIG. 9 is a graph that compares the proton conductivity as a function of relative humidity for NAFION, a crosslinked poly(phenylene sulfonic acid) copolymer containing 10% biphenyl, and a poly(phenylene sulfonic acid) homopolymer.

The proton conductivity as a function of relative humidity at 25° C. and 75° C. was also plotted (FIG. 9) for a crosslinked poly(phenylene sulfonic acid) copolymer containing 10% biphenyl and a poly(phenylene sulfonic acid) homopolymer. The proton conductivity as a function of relative humidity at room temperature was also plotted (FIG. 9) for NAFION. FIG. 9 shows that the crosslinked 10% biphenyl material at 75° C. exhibits a plateau at about 0.1 mS/cm from about 100% down to about 35% relative humidity. A constant conductivity implies a constant volume, which supports the contention of a built in free volume that hold water molecules very strongly. It would be expected that the conductivity will rise further as the temperature rises. At 25° C. and 15% RH, the conductivity is 0.4 mS/cm. This is too low, and this particular PEM is useful only at 75% RH and above at 25° C.

Figure 10:
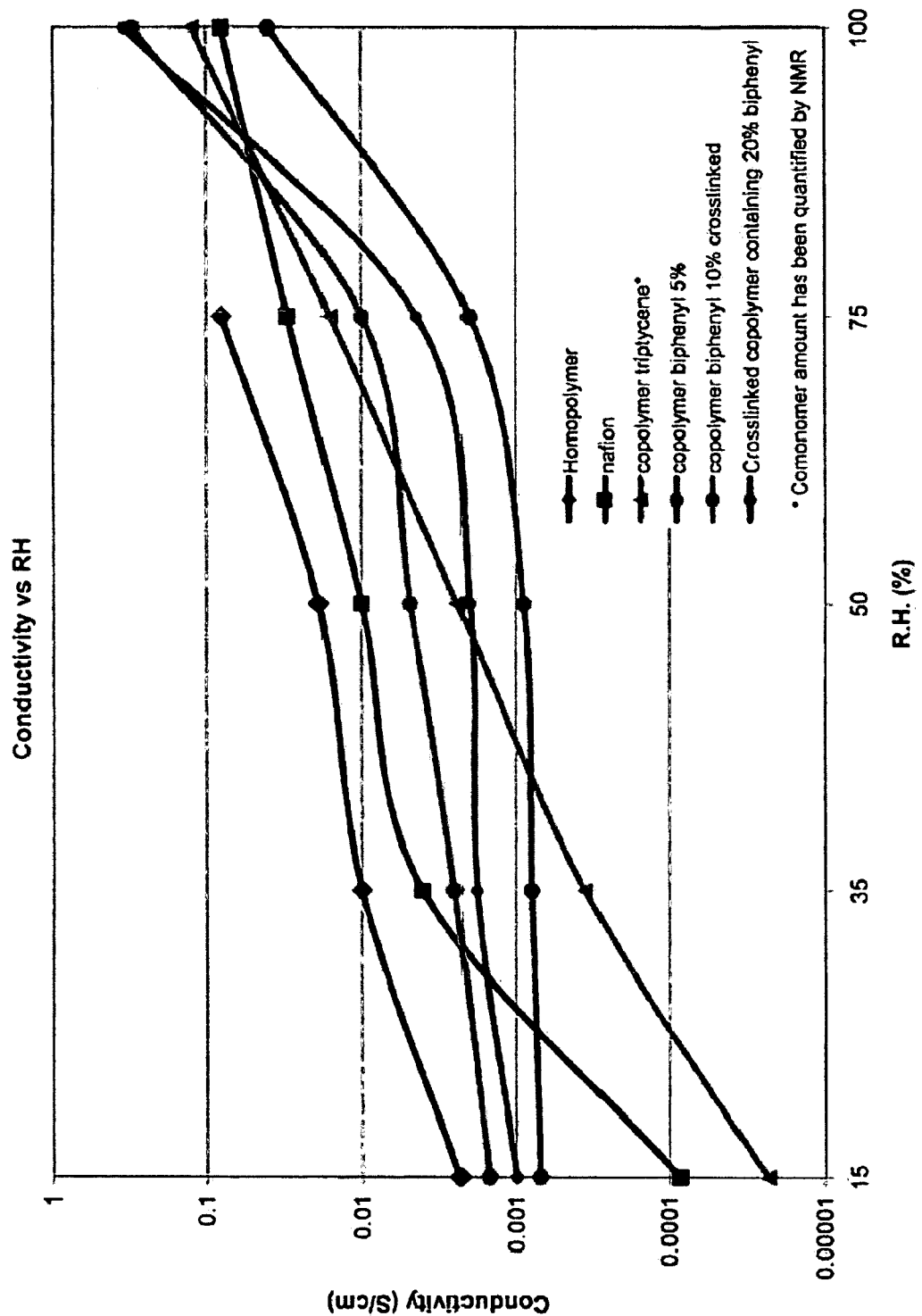
FIG. 10 is a graph that compares the proton conductivity as a function of relative humidity for a poly(phenylene sulfonic acid) homopolymer, NAFION, a poly(phenylene sulfonic acid) copolymer comprising triptycene, a poly(phenylene sulfonic acid) copolymer containing 5% biphenyl, a crosslinked poly(phenylene sulfonic acid) copolymer containing 10% biphenyl, and a crosslinked poly(phenylene sulfonic acid) copolymer containing 20% tert-butyl phenyl.

The proton conductivity (MS/cm) as a function of relative humidity at 25° C. was further plotted (FIG. 10) for a polyphenylenesulfonic acid homopolymer, NAFION, a polyphenylenesulfonic acid copolymer comprising triptycene, a crosslinked poly(phenylene sulfonic acid) copolymer containing 5% biphenyl, a crosslinked poly(phenylene sulfonic acid) copolymer containing 10% biphenyl, and a poly(phenylene sulfonic acid) copolymer containing 20% tert-butyl phenyl. FIG. 10 like FIG. 9 shows that the poly(phenylene sulfonic acid) copolymers containing biphenyl (5%, 10%, and 20%) exhibit a plateau from about 75% down to about 15% relative humidity. A constant conductivity implies a constant volume, which supports the contention of a built in free volume that hold water molecules very strongly.

Figure 11:
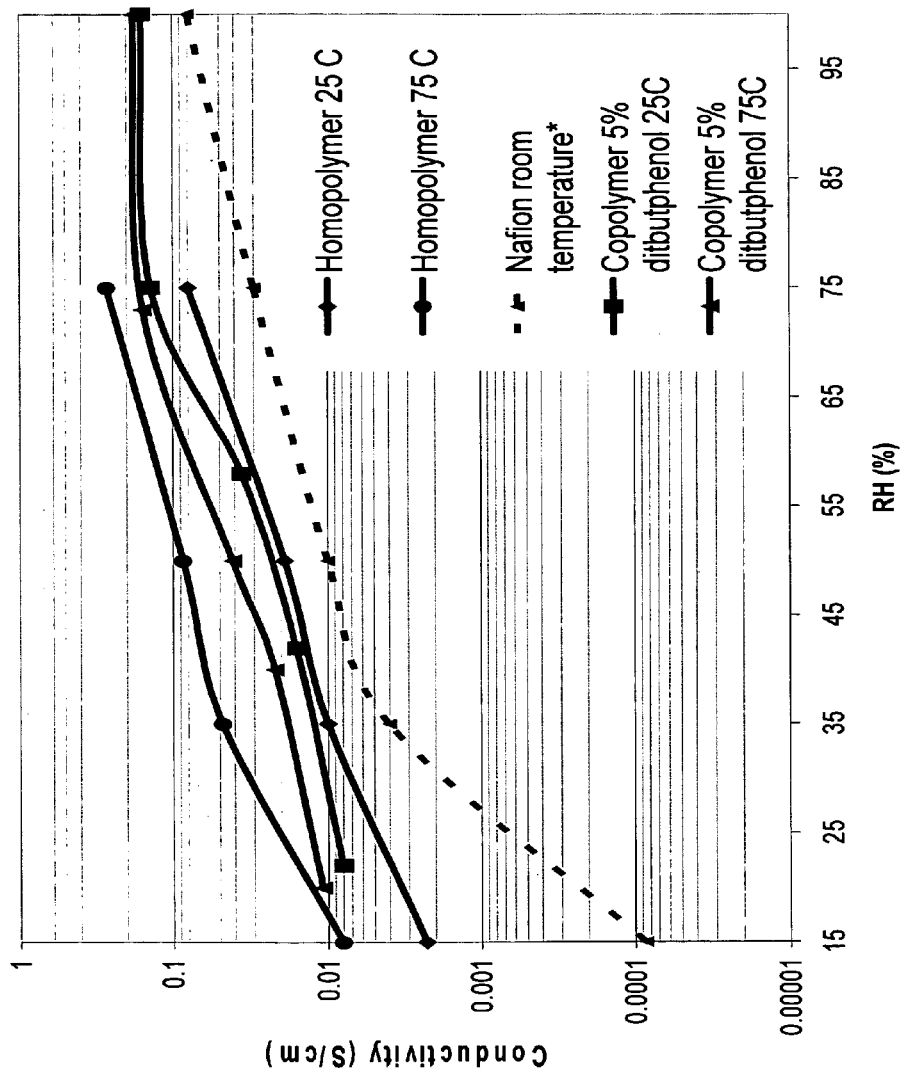
FIG. 11 is a graph that compares the proton conductivity as a function of relative humidity and temperature for NAFION, a poly(phenylene sulfonic acid) copolymer containing 5% di-(tert-butyl)phenol, and a poly(phenylene sulfonic acid) homopolymer.

The proton conductivity as a function of relative humidity at 25° C. and 75° C. was also plotted (FIG. 11) for a poly(phenylene sulfonic acid) copolymer containing 5% di(tert-butyl)phenol (i.e., di(tert-butyl)hydroxyphenyl) and a poly(phenylene sulfonic acid) homopolymer. The proton conductivity as a function of relative humidity at room temperature was also plotted (FIG. 11) for NAFION. FIG. 11 shows that the poly(phenylene sulfonic acid) copolymer containing 5% di(tert-butyl)phenol material exhibits a gradual increase in conductivity at relative humidity between 25% and 65%. A gradual increase in conductivity implies a relatively constant volume, which supports the contention of a built in free volume that hold water molecules very strongly. The conductivity for this copolymer was 8 mS/cm at 20% RH and rose to 10 mS/cm, at 75° C. and 18% RH. These values are the highest for any water soluble PEM that have been reported. They are several orders of magnitude more conductive than NAFION, and higher than those of the rigid rod liquid crystal polyimides reported in U.S. Pat. No. 6,586,561.

Figure 12:
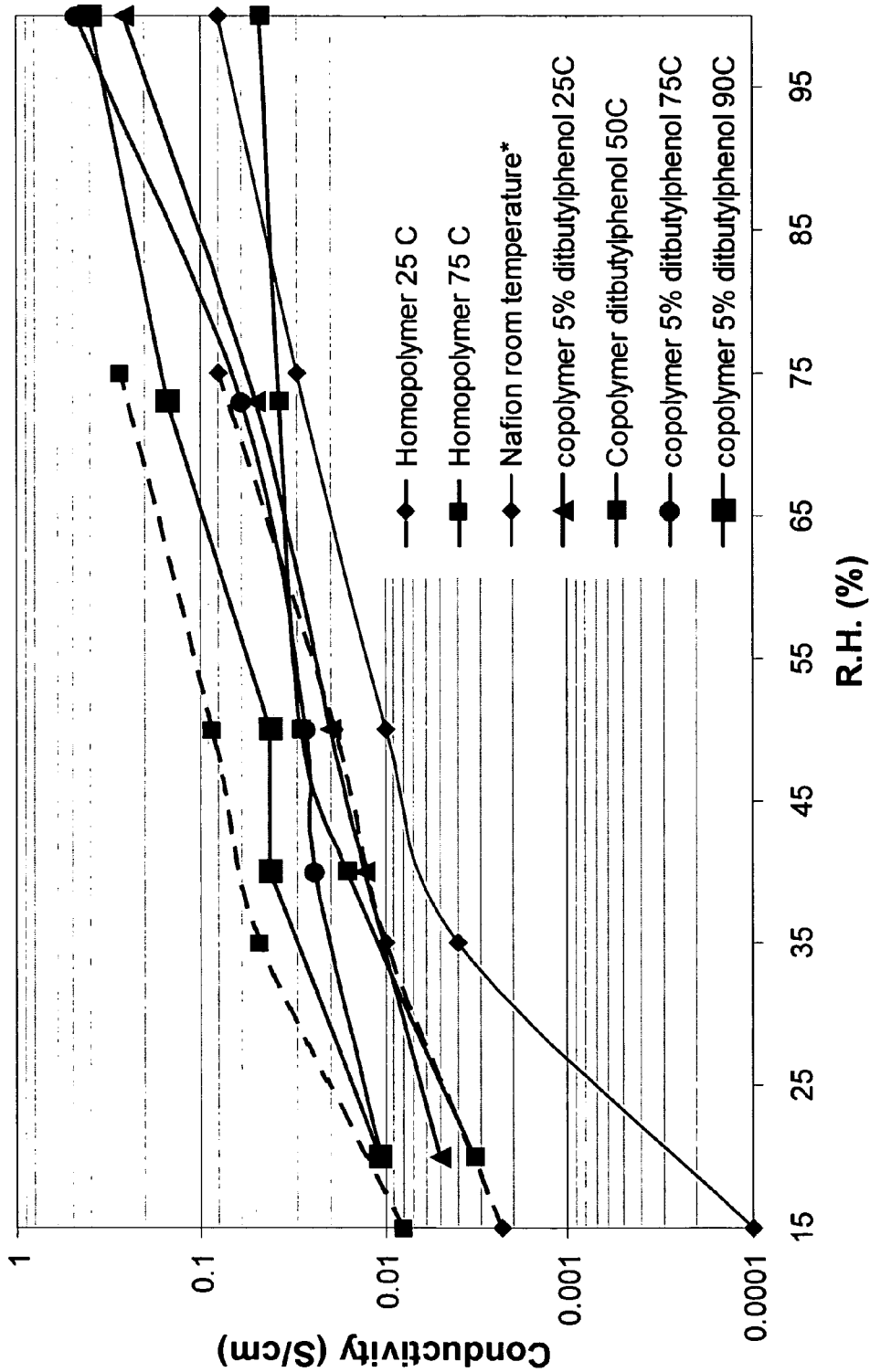
FIG. 12 is a graph that compares the proton conductivity as a function of relative humidity for NAFION, a poly(phenylene sulfonic acid) copolymer containing 5% di-(tert-butyl)phenol, and a poly(phenylene sulfonic acid) homopolymer.

The proton conductivity as a function of relative humidity at 25° C., 50° C., 75° C., and 90° C. was plotted (FIG. 12) for a poly(phenylene sulfonic acid) copolymer containing 5% di(tert-butyl)phenol (i.e., di(tert-butyl)hydroxyphenyl). The proton conductivity as a function of relative humidity at 25° C. and 75° C. was also plotted (FIG. 12) for a poly (phenylene sulfonic acid) homopolymer. The proton conductivity as a function of relative humidity at room temperature was also plotted (FIG. 12) for NAFION. FIG. 12 shows that the poly(phenylene sulfonic acid) copolymer containing 5% di(tert-butyl)phenol material exhibits a gradual increase in conductivity at relative humidities between 25% and 65%. FIG. 12 shows that for this polymer, the increase of temperature at a given relative humidity had little effect on the increase in conductivity. The copolymer with 5 mole % di-t-butyl phenol grafted had about the same conductivity as the homopolymer at room temperature. While conductivity did not rise as rapidly with a temperature rise as did the homopolymer conductivity, it was usable at 75° C. or 90° C. down to 35% RH, with a conductivity >30 mS/cm.

Figure 13:
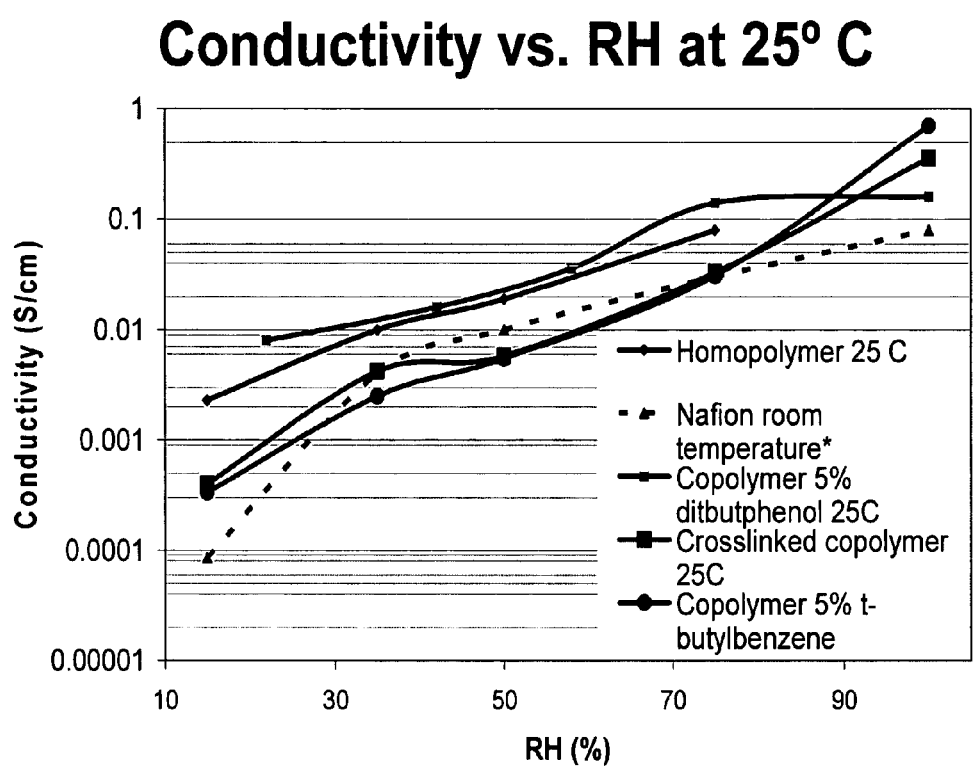
FIG. 13 is a graph that compares the proton conductivity as a function of relative humidity for NAFION, a poly(phenylene sulfonic acid) copolymer containing 5% tert-butyl benzene, a poly(phenylene sulfonic acid) homopolymer, a poly(phenylene sulfonic acid) copolymer containing 5% di-(tert-butyl)phenol, and a crosslinked poly(phenylene sulfonic acid) copolymer containing 5% biphenyl.

The proton conductivity as a function of relative humidity at 25° C. was plotted (FIG. 13) for NAFION, a crosslinked poly(phenylene sulfonic acid) copolymer containing 20% biphenyl, a poly(phenylene sulfonic acid) copolymer containing 5% tert-butyl benzene (i.e., tert-butyl phenyl), a poly(phenylene sulfonic acid) homopolymer, and a poly (phenylene sulfonic acid) copolymer containing 5% di(tert-butyl)phenol. FIG. 13 shows that this preparation of copolymer containing 5% di(tert-butyl)phenol had a slightly higher conductivity than the homopolymer. The other bulky copolymer and crosslinked copolymer had lower conductivities than the homopolymer. This indicates that the copolymer containing 5% di(tert-butyl)phenol holds water more tightly compared to the other copolymers and maintains a high conductivity at lower relative humidity compared to other copolymers.

It will be appreciated that the proton conductivity for identically labeled polymer in the preceding proton conductivity examples varies from sample to sample. These variations are due to subtle compositional differences between polymer batches, which can result, for example, from variations in grafting and crosslinking conditions. The best results in the preceding proton conductivity examples potentially represent the minimum values expected for these materials once control of polymer synthesis is established.

What has been described above includes examples and implementations of the present invention. Because it is not possible to describe every conceivable combination of components, circuitry or methodologies for purposes of describing the present invention, one of ordinary skill in the art will recognize that many further combinations and permutations of the present invention are possible. Accordingly, the present invention is intended to embrace all such alterations, modifications and variations that fall within the spirit and scope of the appended claims.

Having described the invention the following is claimed:

1. A rigid, rod liquid crystal polymer, comprising a poly(phenylensulfonic acid) synthesized via an Ullmann coupling reaction from a monomer including a dihaloaryl sulfonic acid monomer.

2. The polymer of claim 1, the dihalo aryl sulfonic acid monomer comprising at least one of a dihalophenyl sulfonic acid monomomer, a dihalophenyl disulfonic acid monomer, a dihalo-biphenyldisulfonic acid monomer, a dihalo-triphenyldisulfonic acid monomer, or a dihalo-triphenyl trisulfonic acid monomer.

3. The polymer of claim 1, the poly(phenylene sulfonic acid) comprising a biphenylene disulfonic acid repeating unit, the biphenylene disulfonic acid repeating unit forming a substantial portion of a main chain of the polymer.

4. The polymer of claim 1, the poly(phenylene sulfonic acids) being chemically modified to incorporate at least one of bulky side groups, angled groups, or cross-linkable groups on a main chain of the polymer.

5. The polymer of claim 4, the bulky side groups, angled groups, cross-linkable groups rendering the poly(phenylene sulfonic acids) substantially water insoluble.

6. The polymer of claim 4, the at least one of bulky side groups or cross-linkable groups being incorporated onto the poly(phenylene sulfonic acid) backbone via a sulfone or a sulfonate ester formation reaction.

7. The polymer of claim 1, including the following structure:

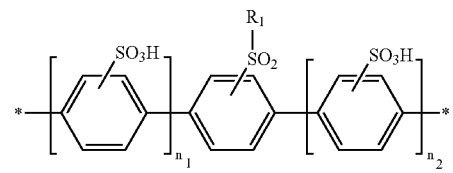

where $R_1$ comprises at least one of a bulky or a cross-linkable group and where at least one of $n_1$ and $n_2$ is not 0.

8. The polymer of claim 7, $R_1$ being selected from the group consisting of tert-butylalkyl groups, tert-butyl phenyl groups, di(tert-butyl)phenyl groups, tert-butyl groups, tert-butyl benzyl groups, tert-butylaryl groups, tert-butylalkylaryl groups, di(tert-butylalkyl)aryl groups, tert-butyl hydroxyl, alkoxy, or aryloxy phenyl groups, di(tert-butyl) hydroxyl, alkoxy, or aryloxy phenyl groups, bulky aryl groups, bulky alkylaryl groups, tert-amyl groups, adamantyl groups, adamantylphenyl groups, substituted and unsubstituted phenols and thiophenols, 1,3,5-triphenyl benzene, trypticene, tetracylene, polycylic aromatic hydrocarbons, linear and branched fluoroalkyl groups, fluoroalkyl sulfones, block hydrocarbon/fluorocarbon groups, and ethers thereof.

9. The polymer of claim 1 comprising a random, graded or block repeating units of phenylene sulfonic acid and a second repeating unit that contains at least one bulky group, angled group, or cross-linkable group.

10. A method of forming a rigid, rod liquid crystal polymer;
polymerizing via an Ullmann coupling reaction a dihaloaryl sulfonic acid monomer to form a poly(phenylene sulfonic acid).

11. The method of claim 10, the dihaloaryl sulfonic acid monomer comprising at least one of a dihalophenyl sulfonic acid monomomer, a dihalophenyl disulfonic acid monomer, a dihalo-biphenyldisulfonic acid monomer, a dihalo-triphenyldisulfonic acid monomer, or a dihalo-triphenyl trisulfonic acid monomer.

12. The method of claim 10, the dihaloaryl sulfonic acid monomer comprising at least one of a 4,4'-dihalo-2,2'-biphenyldisulfonic acids, 4,4'-dihalo-3,3'biphenyldisulfonic acid, or a 1,4-dihalophenyl sulfonic acid.

13. The method of claim 12, further comprising chemically modifying the poly(phenylene sulfonic acid) to incorporate at least one of bulky groups or cross-linkable groups.

14. The method of claim 13, the at least one of bulky groups or cross-linkable groups being incorporated onto the poly(phenylene sulfonic acid) backbone via a sulfone or sulfonate ester formation reaction.

15. The method of claim 13, at least one of bulky groups or cross-linkable groups being selected from the group consisting of tert-butylalkyl groups, tert-butyl phenyl groups, di(tert-butyl)phenyl groups, tert-butyl groups, tert-butyl benzyl groups, tert-butylaryl groups, tert-butylalkylaryl groups, di(tert-butylalkyl)aryl groups, tert-butyl hydroxyl, alkoxy, or aryloxy phenyl groups, di(tert-butyl) hydroxyl, alkoxy, or aryloxy phenyl groups, bulky aryl groups, bulky alkylaryl groups, tert-amyl groups, adamantyl groups, adamantylphenyl groups, substituted and unsubstituted phenols and thiophenols, 1,3,5-triphenyl benzene, trypticene, tetracylene, and polycylic aromatic hydrocarbons, linear and branched fluoroalkyl groups, fluoroalkyl sulfones, block hydrocarbon/fluorocarbon groups, and ethers thereof.

* * * * *